United States Patent
Heselhaus et al.

(10) Patent No.: US 7,455,347 B2
(45) Date of Patent: Nov. 25, 2008

(54) VEHICLE ROOF STRUCTURE FOR MOTOR VEHICLE

(75) Inventors: Udo Heselhaus, Ibbenbüren (DE); Winfried Bunsmann, Bissendorf (DE); Franz Ulrich Brockhoff, Bramsche (DE)

(73) Assignee: Wilhelm Karmann GmbH, Osnabruck (DE)

( * ) Notice: Subject to any disclaimer, the term of this patent is extended or adjusted under 35 U.S.C. 154(b) by 19 days.

(21) Appl. No.: 10/580,282

(22) PCT Filed: Sep. 16, 2004

(86) PCT No.: PCT/DE2004/002087

§ 371 (c)(1), (2), (4) Date: May 23, 2006

(87) PCT Pub. No.: WO2005/032867

PCT Pub. Date: Apr. 14, 2005

(65) Prior Publication Data

US 2007/0080558 A1  Apr. 12, 2007

(30) Foreign Application Priority Data

Sep. 30, 2003 (DE) ................ 103 45 296

(51) Int. Cl.
*B60J 10/10* (2006.01)
(52) U.S. Cl. ................. 296/107.17
(58) Field of Classification Search ........... 296/107.17, 296/107.18, 107.19, 107.2, 107.07, 107.08
See application file for complete search history.

(56) References Cited

U.S. PATENT DOCUMENTS

| | | | | |
|---|---|---|---|---|
| 5,975,620 A * | 11/1999 | Jambor et al. | ......... | 296/107.17 |
| 6,312,042 B1 * | 11/2001 | Halbweiss et al. | ..... | 296/107.17 |
| 6,837,533 B2 * | 1/2005 | Wojciech et al. | ....... | 296/107.17 |
| 2001/0017478 A1 | 8/2001 | Reinsch | | |
| 2001/0020793 A1 | 9/2001 | Eberle | | |
| 2002/0060471 A1 | 5/2002 | Bergerhoff et al. | | |
| 2003/0184116 A1 | 10/2003 | Guillez et al. | | |
| 2006/0267371 A1 * | 11/2006 | Queveau et al. | ........ | 296/107.18 |
| 2007/0080558 A1 * | 4/2007 | Heselhaus et al. | ...... | 296/107.08 |
| 2007/0090665 A1 * | 4/2007 | Wezyk et al. | .......... | 296/107.17 |

FOREIGN PATENT DOCUMENTS

DE  197 06 397  6/1998

(Continued)

*Primary Examiner*—Kiran B. Patel
(74) *Attorney, Agent, or Firm*—Michael Best & Friedrich LLP

(57) ABSTRACT

A vehicle roof structure (10), which has at least one rear-side convertible top compartment lid (16) and a rigid roof part (12) movable between an opened- and a closed position, which roof part (12) extends in the closed position between a windshield frame (14) of the vehicle and the convertible top compartment lid (16) and in the opened position is stored in a space underneath the convertible top compartment lid (16), is movable between the closed position and the opened position by a linkage mechanism (30, 36) and is additionally provided with at least one guide device (40, 42, 44), with which the roof part (12) is in contact during at least one portion of its movement path between the opened- and closed position and which effects a directional change of the movement path of the roof part (12) when it arrives in contact with the roof part.

23 Claims, 20 Drawing Sheets

FOREIGN PATENT DOCUMENTS

| | | |
|---|---|---|
| DE | 198 51 231 | 5/2000 |
| DE | 199 30 616 | 9/2000 |
| DE | 100 01 941 | 5/2001 |
| DE | 100 06 290 | 5/2001 |
| DE | 100 20 663 | 11/2001 |
| DE | 100 57 872 | 5/2002 |
| DE | 102 54 366 | 6/2004 |
| DE | 102 54 365 | 7/2004 |
| FR | 2 854 353 | 11/2004 |
| WO | WO 01/85480 | 11/2001 |

* cited by examiner

VEHICLE ROOF STRUCTURE FOR MOTOR VEHICLE

CROSS-REFERENCE

This aplication is the U.S. national stage filing of International Application No. PCT/DE2004/002087 filed Sep. 17, 2004, which claims priority to German patent application no. 103 45 296.6 filed Sep. 30, 2003.

TECHNICAL FIELD

The invention concerns a vehicle roof structure, in which a movable roof part is movable between an opened position and a closed position. As a result, the invention relates, in particular, to a vehicle roof structure, in which the movable roof part is rigid. The invention further concerns a motor vehicle having a constricted vehicle body opening line having a corresponding vehicle roof structure.

BACKGROUND ART

A passenger car having a rigid roof part, which is guided in the side roof frame and is movable into the rear area, and an at least partly lowerable rear window pane part, which is guided into its closed position between so-called C-pillar sections of the roof frame, is known from DE 198 51 231 A1. The rigid roof part of the passenger car is displaceable in the longitudinal direction of the vehicle. When opening the roof with this arrangement, the rear window pane part is initially brought into an at least partly lowered, and thus at least partly opened, position. For this purpose, the rear window pane part is further displaceable or relocateable in the direction of the rear area of the passenger car in guide rails provided on the inner sides of the C-pillar sections. In a further step, the roof part is then opened. For this purpose, the roof part will displace starting from its closed position rearwardly, i.e. in the rear area of the passenger car, in the longitudinal direction of the vehicle. Roof part sections, which laterally border on the roof part along the forward driving direction of the vehicle in the closed position thereof, are ultimately removable by bringing the roof part sections into the area of the C-pillar sections, so that a so-called Targa version of the passenger car is formed. When moving the roof part into the opened position, the roof part is guided in the area of its forward edge in a guide rail provided on the face plate of the roof part sections of the roof frame and with its rear edge guided in a sliding path that is affixed on the inner side of the C-pillar section. In addition, for opening, the roof part can be slightly pivoted about a rotational axis extending traverse to the longitudinal direction of the vehicle. When the roof part contacts the guide rail, in so far as it does not somehow move completely within the guide rail over the entire opening movement, a directional change of the movement path of the roof part will not be caused. In fact, the movement proceeds continuously.

A vehicle roof structure is known from DE 100 01 941 C1, in which a folding- and/or sun-roof is displaceably guided in the area of side bars between an A-pillar and a B-pillar of the vehicle, as well as in a position behind these pillars. The side bars are detachably connected with the A-pillar and the B-pillar and can be transferred by means of a mechanism into a storage space in the area of a rear shelf of the vehicle. For the transfer of the side bars, a linkage kinematic is provided, which produces a movement path for the side bars; the movement path consists of a pivoting component between the side bar being disposed in its position between the A-pillar and B-pillar and the side bar being disposed its position in the storage space lying substantially in a vertical plane and of a rotating component, which corresponds to the rotational displacement of the side bar by approximately 90° from its location between the A-pillar and B-pillar into its traverse position in the storage space.

DE 100 20 663 C2 concerns a roof construction for a motor vehicle having an upwardly liftable roof. This upwardly liftable roof, which is designed as a hard shell top or hard top, consists of a first, forward roof part and a second, rear roof part. The forward roof part is connected with a main bearing affixed to the vehicle body via a first linkage connection formed as a 4-bar linkage. The rear roof part is connected with a second 4-bar linkage as a linked connection with a main bearing part affixed to the vehicle body. An electronic drive or a hydraulic drive are optionally provided for moving the linkage mechanism.

In DE 102 54 366, which is not yet published as of the application filing date, a Targa-vehicle is described that comprises at least one forward roof part that is capable of opening. Multiple movable roof parts are also possible. Outer areas of the roof part can be pivoted in onto the middle roof part about an axis parallel to the longitudinal axis of the vehicle, so that the width of the movable roof part is reduced. The movable roof part is movably held vis-à-vis the vehicle body by means of a linkage. The connecting rods of the linkage are guided in slot recesses that lie parallel to the fins of the fin roof and essentially extend over their entire length. The linkage, which is moved e.g. by an electronic or hydraulic drive device, is supported on one end affixed to the vehicle body and engages with the free end on the connecting rod. The connecting rod, which is likewise supported on one end and affixed to the vehicle, acts on the other connecting rod via intermediate levers, so that a multiple-bar linkage is formed, with which initially an essentially linear shifting of the roof part to its opening is possible.

A Targa-vehicle is known from DE 102 54 365, which is not yet published as of the application filing date, in which outer-lying areas of a roof part can be moved with respect to a middle area, so that the movable roof part is variable between a reduced width and a normal width and in the reduced width is movable between its opened- and closed position. The pivotal displacement of the side roof parts is effected by the multi-bar linkage, with the aid of which the outer-lying areas are not only pivoted in, but are also simultaneously lifted. The middle area of the roof part comprises an independent linkage, on which the middle area is movably held vis-à-vis the vehicle body. Connecting rods are guided in slot grooves, which lie parallel to the fins and essentially extend over its entire length. For loading of the roof part into the rear area, a rear roof part pivots up about an axis extending essentially perpendicular to the forward driving direction of the vehicle.

SUMMARY

Based upon this, it is an object of the invention to provide a roof structure of the above-mentioned type, wherein the opening of the movable roof part and the loading into its storage position takes place reliably and stably.

This object is achieved by a vehicle roof structure according to the present invention.

The concept underlying the invention is to stabilize a vehicle roof structure, in which the roof part is movable by a linkage mechanism between the opened- and closed position, by the provision of an additional guide device, so that the movement between the opened- and closed position takes places in a precisely defined manner and, if necessary, can change its direction multiple times in order to achieve a curved movement path. For this, the guide device is provided, so that the roof part and/or the linkage mechanism affixed thereon is not in contact with the guide device over the entire movement path between the opened- and the closed position, but rather to the contrary, the contact with the guide device has the effect that a directional change of the movement path is compelled, e.g., a directional change against a biasing force of a biasing device of the linkage mechanism. By the provision of a separate guide device, which arrives in contact with the roof part only during one leg of the guide path, a defined directional change of the movement path of the roof part can, on the one hand, be achieved. On the other hand, the roof part can be additionally supported on the guide device during the guided part of the movement path, so that the linkage mechanism and the roof part are less susceptible to forces acting thereon, e.g. side forces, during the movement from the opened position into the closed position and/or from the closed position into the opened position. Thus, a flawless mode of operation of the roof part is achieved when it moves between the opened- and the closed position and when loading the opened roof in the storage position. In particular, in as much as the rearward vehicle space often has only a constricted vehicle body opening line, i.e. deviations from the movement path are not tolerable when opening and/or closing the roof part due to the constricted available space, a precisely-guided movement is advantageous in order to load the preferably rigid roof through the constricted opening of the vehicle body into the rearward vehicle space. Otherwise, a jamming and/or damage of the vehicle would possibly occur. Consequently, the vehicle roof structure is particularly suitable for a vehicle having a constricted vehicle body opening line. Most notably, the inventive construction offers the advantage that the directional changes of the movement path of the roof part are possible without the precision of the guidance being affected. Thus, the movable roof part can also be positioned in a relatively narrow and difficult-to-access space in the rear part of the vehicle and can be guided though constricted space proportions.

In a preferred aspect of the present teachings, the guide device may include at least one guide element, preferably a roller, that is supported on the convertible top compartment lid or the vehicle body and arrives in engagement with a guide path provided on the roof part when moving the roof part from the closed position into the opened position so that the roller moves along the guide path in contact therewith. By constructing the guide element in this manner, it is possible to realize the contact between roof part and guide device without significant additional frictional force, so that scarcely any increased drive power is required for opening and closing the vehicle roof as compared to a construction that does not include the guide element.

In another preferred aspect of the present teachings, the guide path may be formed or provided by an ornamental strip mounted or defined on the surface of the roof part. In this case, the guide path, which is affixed on the roof part and with which guide path the guide device in the form of one or more rollers comes into engagement, can also be shaped in a visually-appealing manner.

In accordance with other preferred features disclosed below, especially well-defined guide paths can be achieved, in particular in view of the movement path of the roof part and the multiple directional changes provided for the movement path.

Overall, it is thus possible to provide a drive for opening and closing of the roof part, which is controlled hydraulically or electrically or another advantageous way and is, e.g., operated from the car dashboard. The drive is preferably divided into individual drives for each respective defined segment of the movement path, which are each separately controllable and operable as individual drives.

The convertible top compartment lid is pivotable upward about an essentially horizontally-extending, rear side axis and in its opened position, provides an unobstructed way, through which the roof part can be brought into the space under the convertible top compartment lid. At the same time, it defines the opening line of the vehicle body by its contour, through which the roof part arrives into the storage space underneath the convertible top compartment lid.

BRIEF DESCRIPTION OF THE DRAWINGS

In the following, a preferred embodiment of the invention will be described in an exemplary manner using the appended figures, wherein.

DETAILED DESCRIPTION OF THE INVENTION

Figure 1:
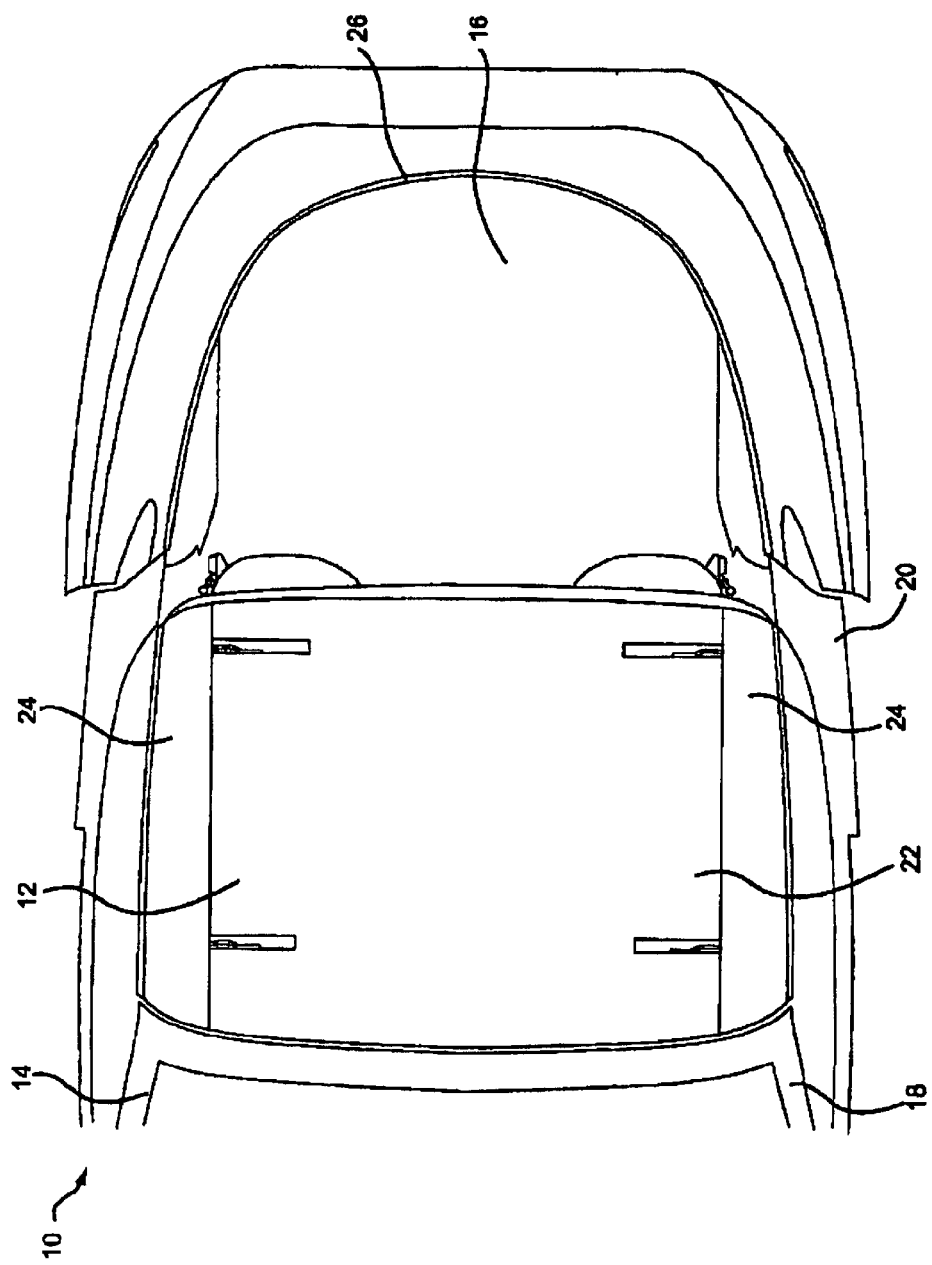
FIG. 1 is a schematic illustration of the inventive vehicle roof structure in top view, wherein the rigid roof part is in the closed position.

The vehicle roof structure 10 of the first embodiment, which is illustrated in FIGS. 1-4 in the closed position, comprises a movable roof part 12, which in the closed position extends in the vehicle longitudinal direction from the windshield frame 14 to a rear roof part that is constructed as a convertible top compartment lid 16; a rear window is integrated within the rear roof part. The movable roof part 12 extends essentially between an A-pillar 18 and a B-pillar 20 of a vehicle and in the installed state, it lies essentially horizontally in the vehicle in the closed position.

The movable roof part 12 is divided into a middle area 22 and two outer areas 24 with reference to a vertical longitudinal middle plane.

Further, in the rear area of the vehicle, an opening line 26 of the vehicle body can be perceived in the top view according to FIG. 1, which opening line 26 is usually highly design oriented and defines the maximal opening, within which the movable roof part 12 can be lowered into the vehicle body, because it simultaneously forms the boundary line between convertible top compartment lid 16, which is upwardly pivotable with reference to the vehicle body about an essentially horizontal axis, and the vehicle body.

Figure 2:
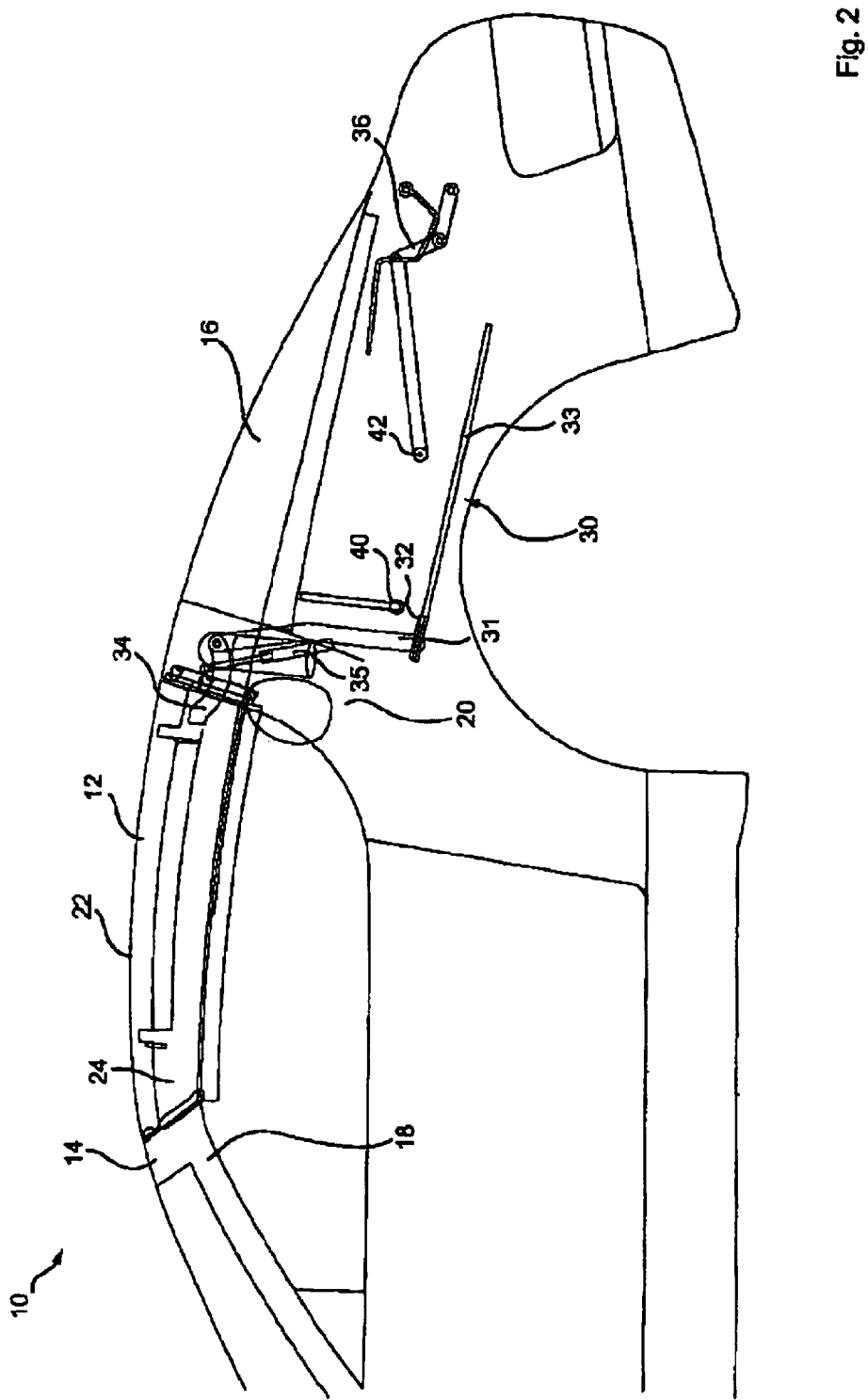
FIG. 2 is a side cross-sectional view of the vehicle roof structure also in the closed position.

For moving the movable roof part 12 and for loading this part 12 into the vehicle body, a linkage mechanism is further provided, which is designated as a whole with reference number 30 (see FIG. 2). The linkage mechanism 30 comprises a connecting rod 31, whose one end is rotatably borne on a carriage 32 that is, in turn, linearly displaceable along the path 33 with reference to the body of the vehicle, i.e. in essentially the longitudinal direction of the vehicle. For this purpose, known guide means for the carriage 32, as well as a drive for the carriage, preferably electronic or hydraulic, if necessary but also e.g. manual, are provided. For rotating the connecting rod about the bearing point between connecting rod 31 and carriage 32, a suitable drive mechanism is provided that preferably is separately controllable from the drive mechanism for the linear movement.

A further connecting rod 34 is rotatably mounted on the free end of the connecting rod 31; the free end of the connecting rod 34 is connected with the movable roof part 12. The angular position between the connecting rod 31 and the connecting rod 34 is biased by a pneumatic spring 35 towards a predetermined angular position, in which the connecting rods 31, 34 form the angle α1. The angles a thus lie within the vehicle longitudinal plane.

Figure 3:
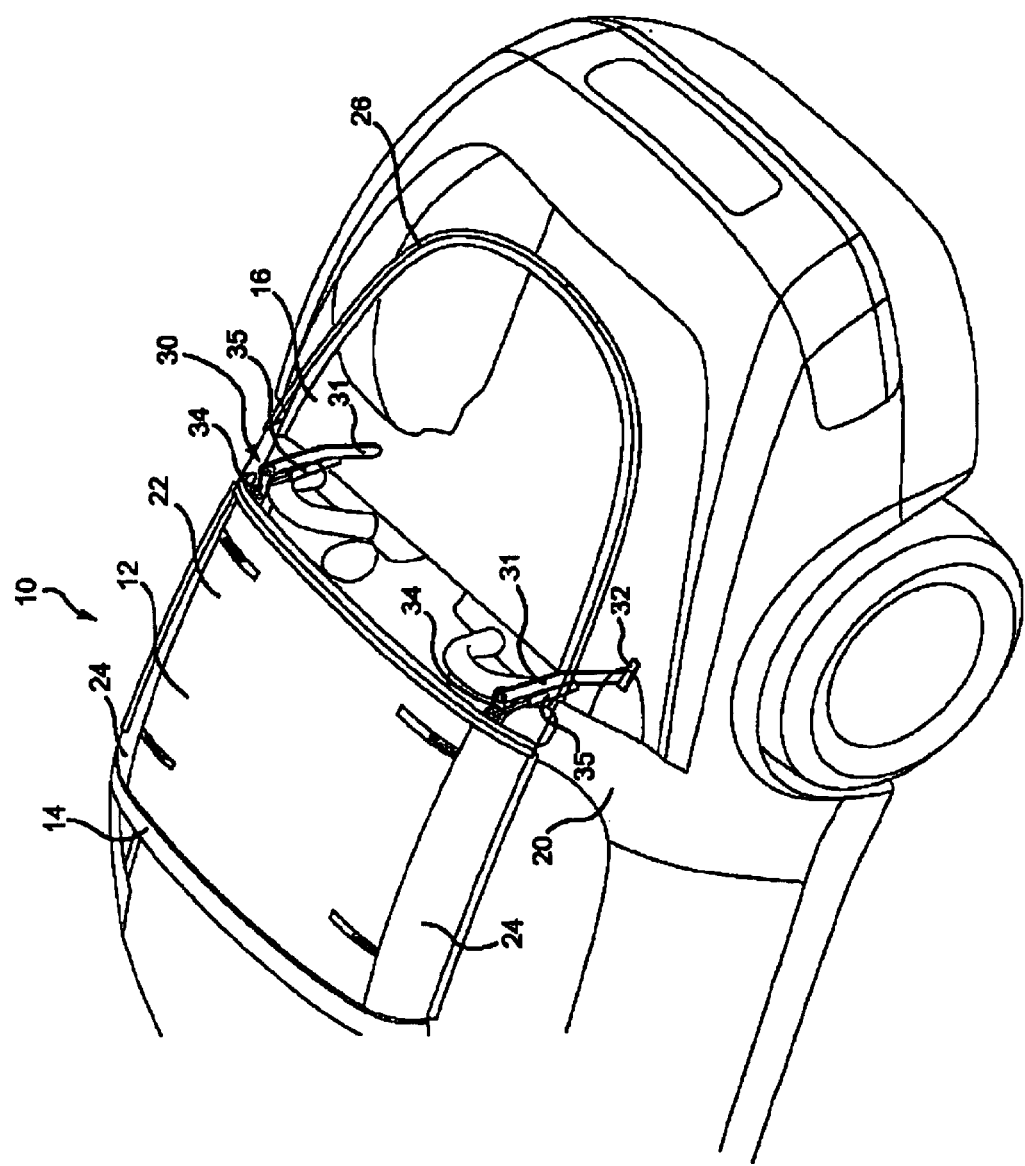
FIG. 3 is the vehicle roof structure of FIG. 1 in perspective view.
Figure 4:
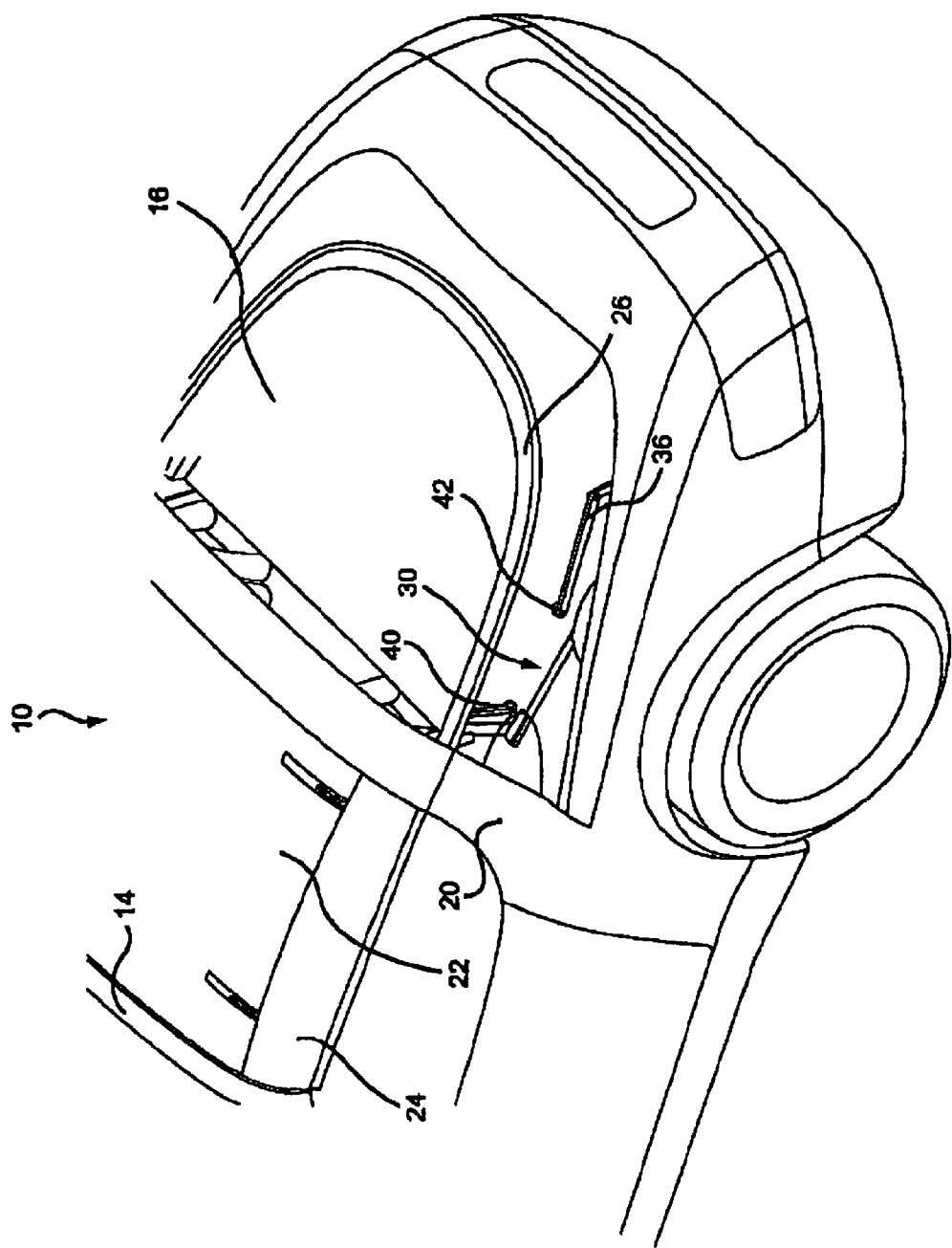
FIG. 4 is a detail of the vehicle roof structure of FIG. 1 in perspective view, wherein parts that are respectively constructed as the vehicle body for the vehicle and thus cover the inner structure are made transparent for illustrative purposes.
Figure 5:
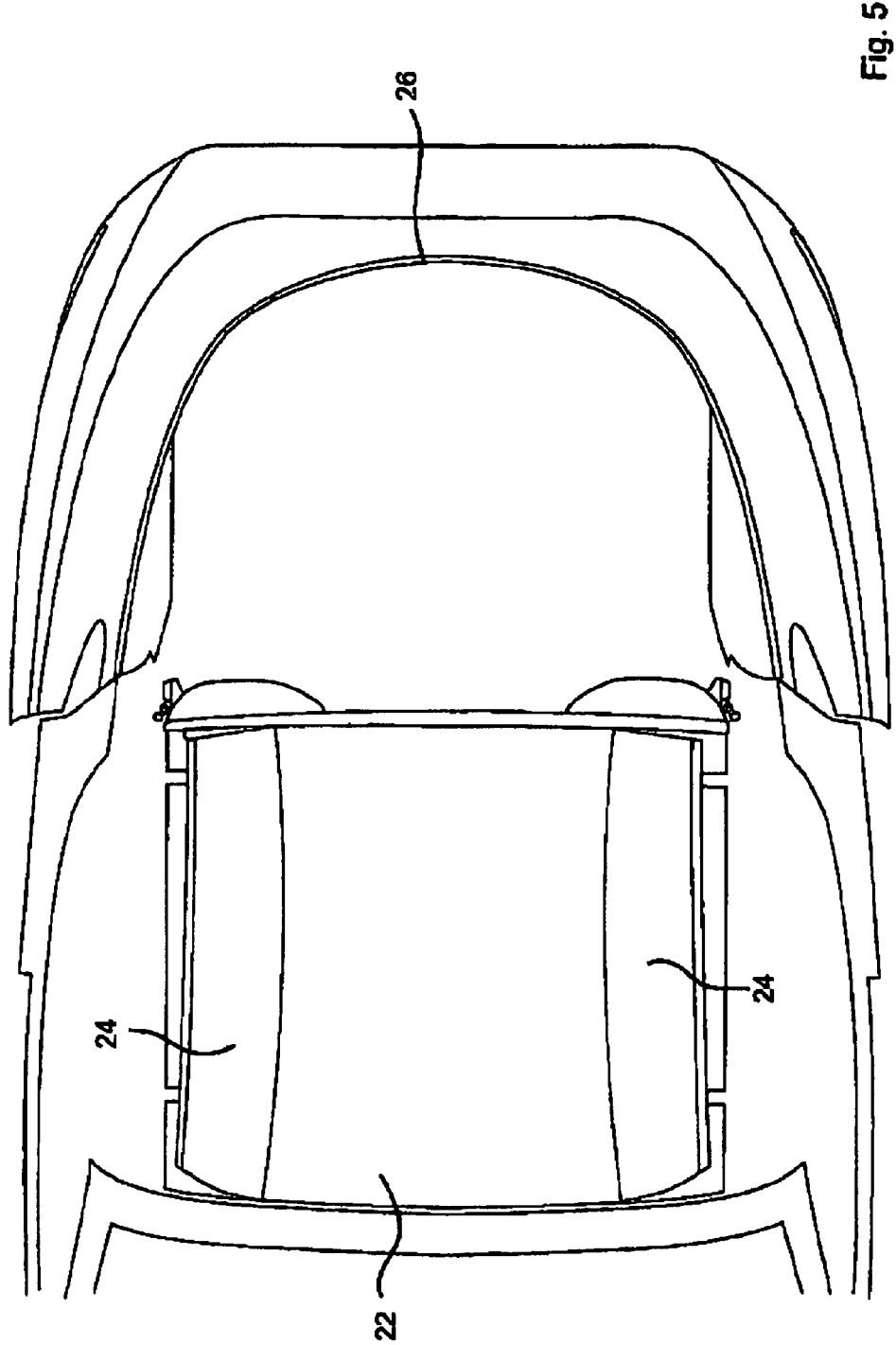
FIG. 5 is a top view of the inventive vehicle roof structure, wherein side areas of the movable roof part are folded into a position for the subsequent opening of the movable roof part.

As can be seen in FIG. 3, a corresponding connecting rod arrangement is preferably provided on both sides of the movable roof part, i.e. the vehicle, thus particularly symmetrical to a longitudinal middle plane of the vehicle. This offers the advantage of ensuring a uniform opening, because the actuating forces are symmetrically applied to the roof part. In the following, only one of the respective linkage mechanisms will be explained. The symmetrically-arranged, second linkage mechanism is, in essence, identically constructed.

For moving the rear roof part 16, which is upwardly pivotable about an axis perpendicular to the vehicle longitudinal direction, a linkage mechanism is likewise provided and is designated with reference number 36. This linkage mechanism is moved by a (not illustrated) drive.

Lastly, the assembly includes another guide mechanism. The guide mechanism is preferably likewise constructed in duplicate and is symmetric with respect to the vehicle longitudinal middle plane. In the illustrated embodiment, the guide mechanism is formed, in part, by two roller pairs 40, 42 serving as guide elements, of which the first roller pair 40 is mounted on an arm that is immovable relative to the rear roof part 16 (in FIG. 2, one roller 40 can be seen; the second roller of the roller pair 40 is provided on the rear roof part 16 symmetrically with reference to the vehicle longitudinal middle plane). The second roller pair 42 is provided on the end of the linkage mechanism 36, which is provided for opening and/or closing of the rear roof part 16. In particular, the roller 42 moves in accordance with the movement of the linkage mechanism 36. Instead of the rollers, other shifting or sliding elements are usable as guide elements, such as e.g. sliding shoes.

Next, the opening of the vehicle roof having the vehicle roof structure 10 according to FIGS. 1-4, as well as the loading of the movable vehicle roof part into a space in the vehicle rear end underneath the convertible top compartment lid 16, will be described with the help of FIGS. 5-20.

Figure 6:
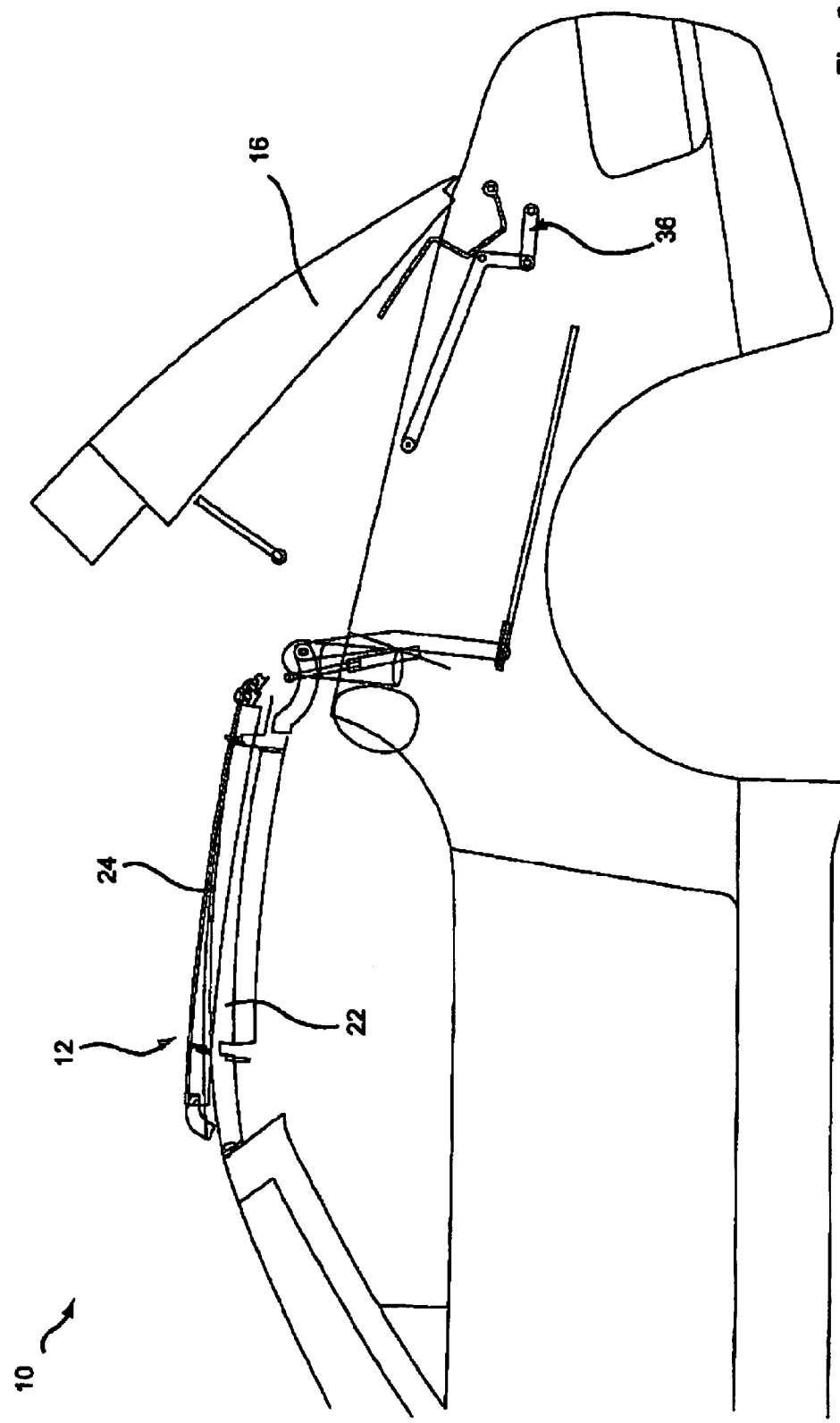
FIG. 6 shows the inventive roof structure in cross-sectional view during the beginning of the opening with folded-in side parts.
Figure 7:
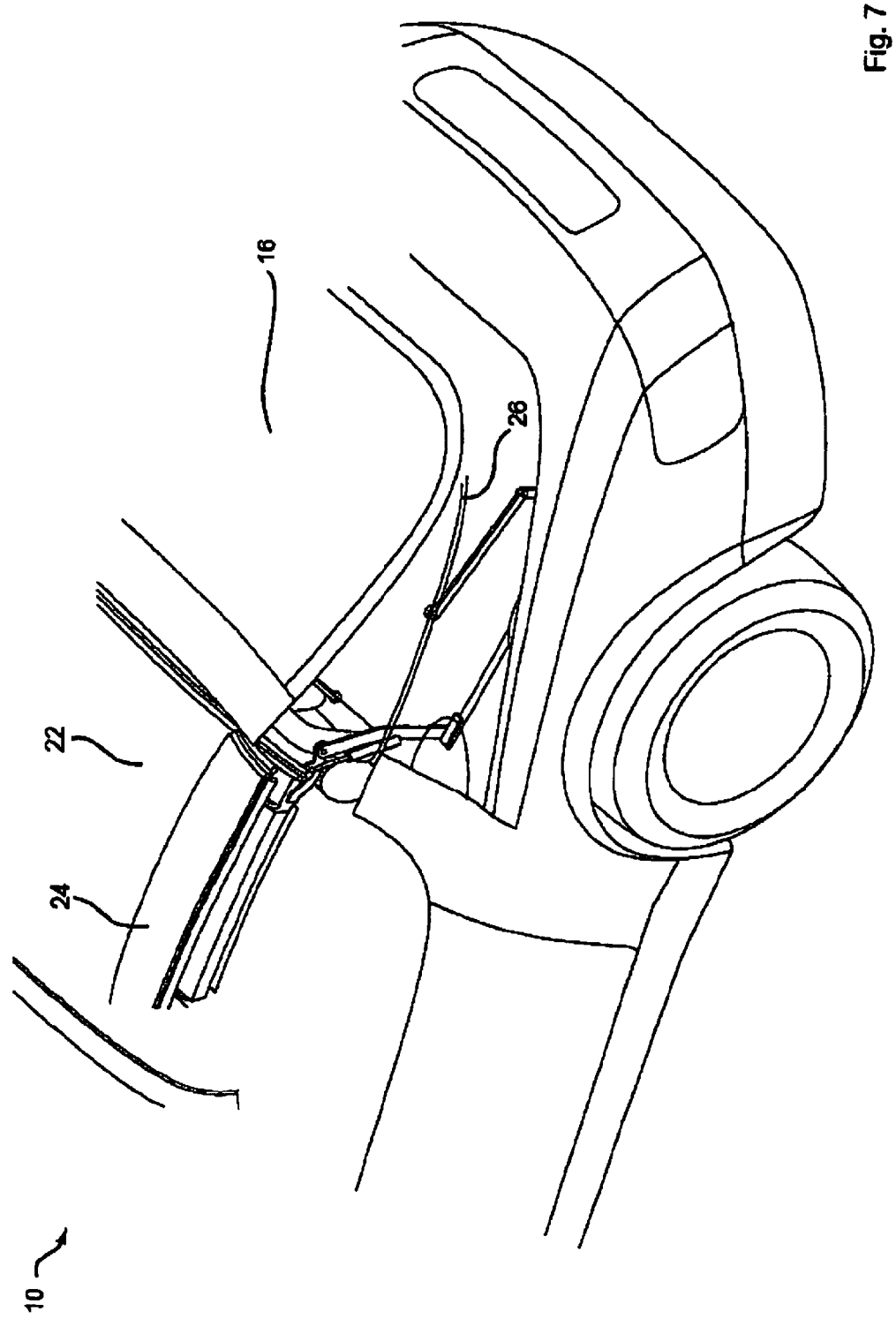
FIG. 7 shows the vehicle roof structure in perspective view during the beginning of the opening corresponding to FIG. 6.
Figure 8:
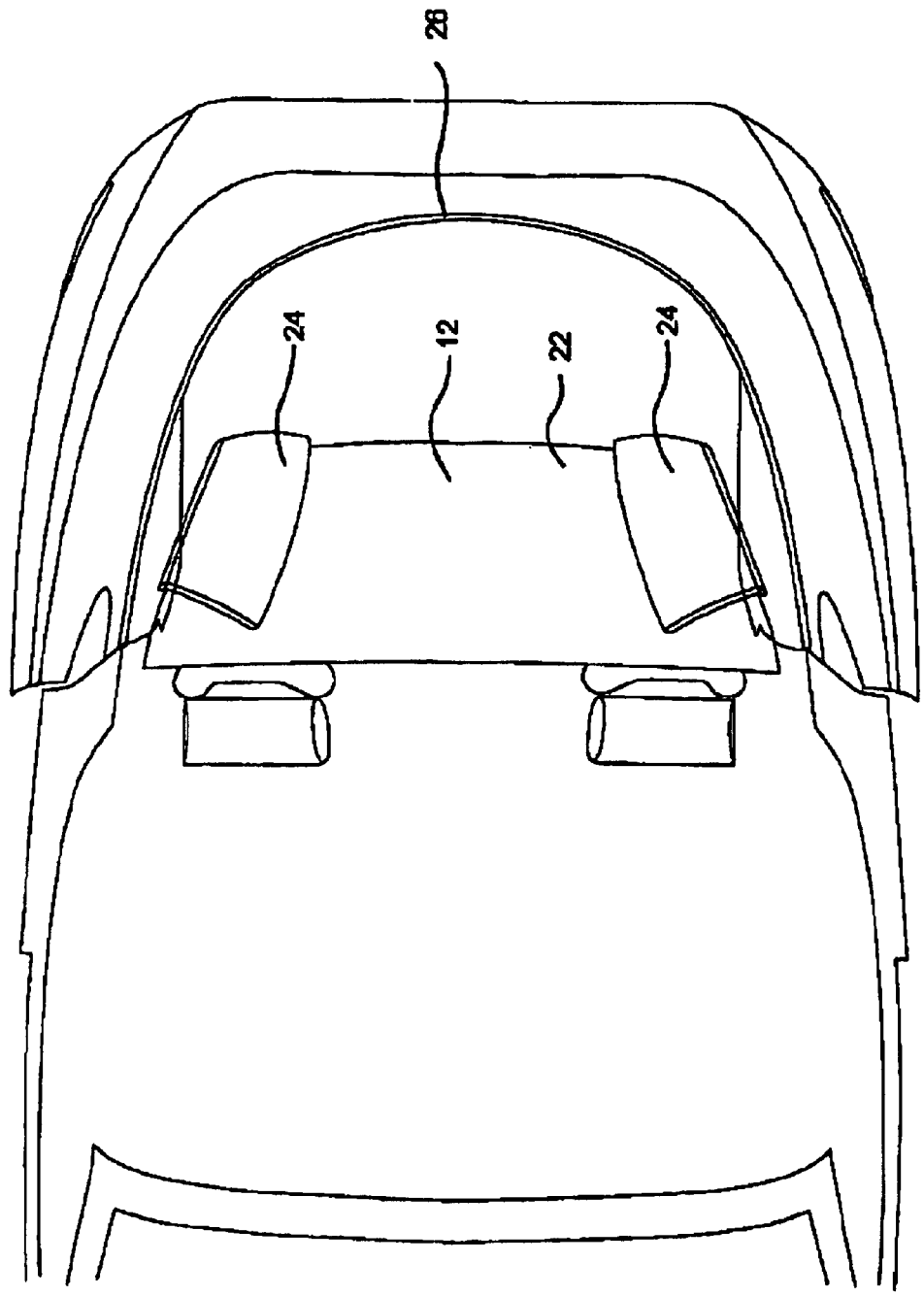
FIG. 8 shows the inventive vehicle roof structure in the top view in a farther advanced opening state, wherein the guide device has just arrived in contact with the roof part.

First, starting from the closed position of the movable roof part 12 that is illustrated in FIGS. 1-4, the movable roof part 12 will be reduced with respect to its width by a mechanism (not illustrated in detail). For this purpose, the side roof parts 24 are pivoted about an axis, which extends essentially parallel to the vehicle longitudinal axis, onto the middle roof part 22. An appropriate structure for moving the side roof parts is explained in DE 02 54 365 (see introduction of the description). Moreover, in the first step, the convertible top compartment lid 16, i.e. the rear roof part, is upwardly pivoted about a pivot axis perpendicular to the vehicle longitudinal direction, as can be seen in FIGS. 6 and 7. An opening in the vehicle rear end defined by the opening line 26 (see FIG. 5) will thereby be uncovered, such that it borders the storage space for the movable roof part 12, so that the movable roof part 12 can be brought into the rear vehicle area and can be lowered into the vehicle body.

In the state, in which the side roof parts 24 lay on the middle roof part 22, the pivoting movement of the movable roof part 12 subsequently begins for loading it into the vehicle body. The first part of the pivoting movement, in which the movable roof part is not in contact with the guide device that is illustrated by the roller pairs 40 and 42, respectively, is effected by the linkage mechanism 30 and is shown in FIGS. 8-11, wherein the rear roof part (convertible top compartment lid) 16 is not illustrated in FIGS. 8-10 for clarity purposes. In order to actuate the pivoting movement of the movable roof part, the connecting rod 31 is pivoted by means of a not-illustrated drive, e.g., a hydraulic drive or an electronic drive, about its bearing point on the carriage 32 and in the counter-clockwise direction, so that the free end of the connecting rod 31, on which the connecting rod 34 is affixed, is rearwardly pivoted, i.e. in the direction towards the vehicle rear end, from the position shown in FIG. 2 into the position shown in FIGS. 9 and 11. Thus, at the beginning of the pivoting movement, none of the guide rollers 40, 42 is in contact with a guide path 44 of the roof part. Moreover, the carriage 32 is held stationary with respect to its linear shifting movement, i.e. in the position that is most directed in the direction towards the vehicle front end (see FIG. 11). The pneumatic spring 35 between the connecting rod 31 and the connecting rod 34 assumes an angle α1 that corresponds to the rest position of the connecting rods with respect to each other, i.e. a position without influence of the guide element. This angle α1 remains unchanged as long as the roller pair 40 does not arrive in contact with the roof part or linkage mechanism.

Figure 9:
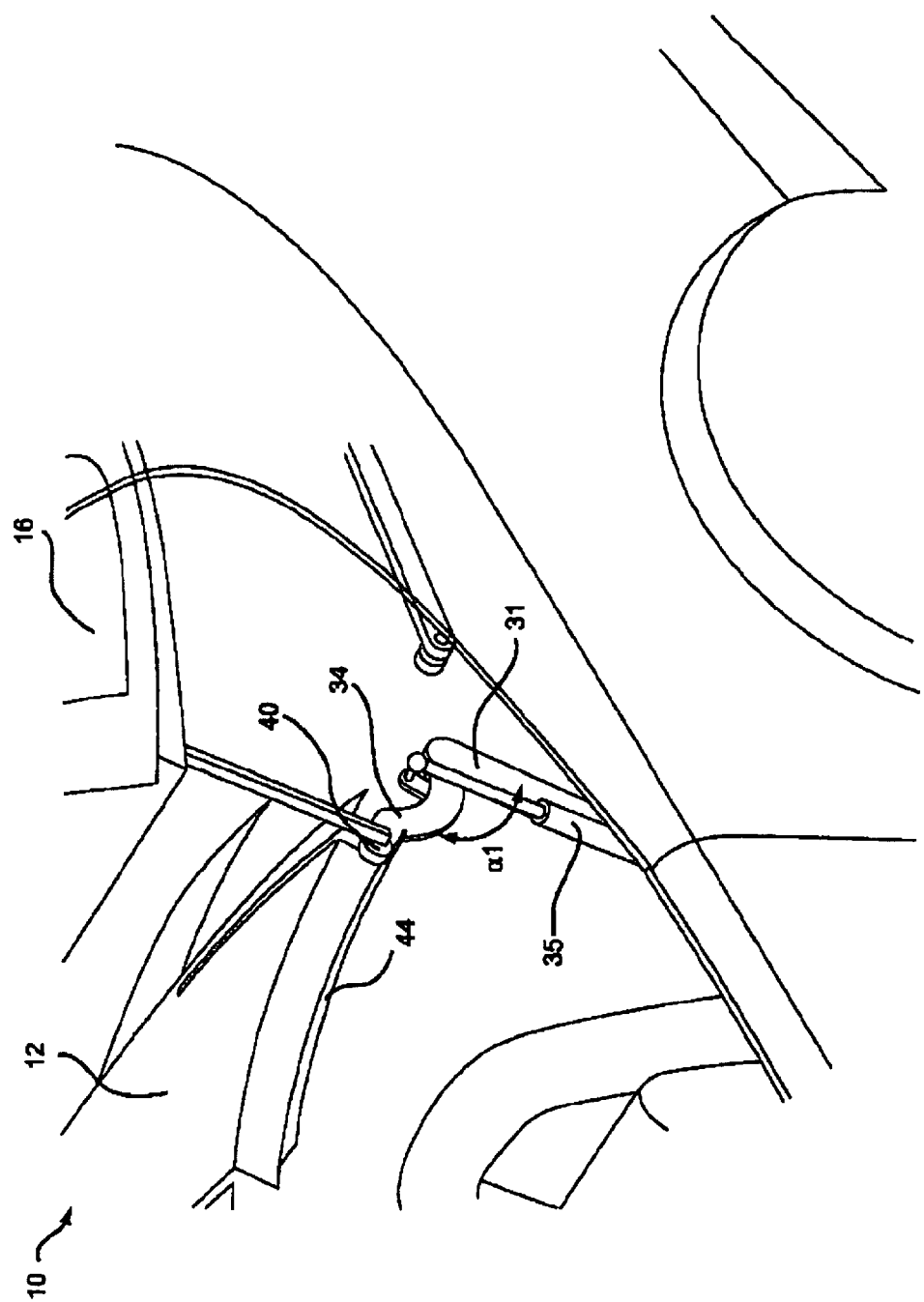
FIG. 9 shows the vehicle roof structure in perspective view in the opening state according to FIG. 8.
Figure 10:
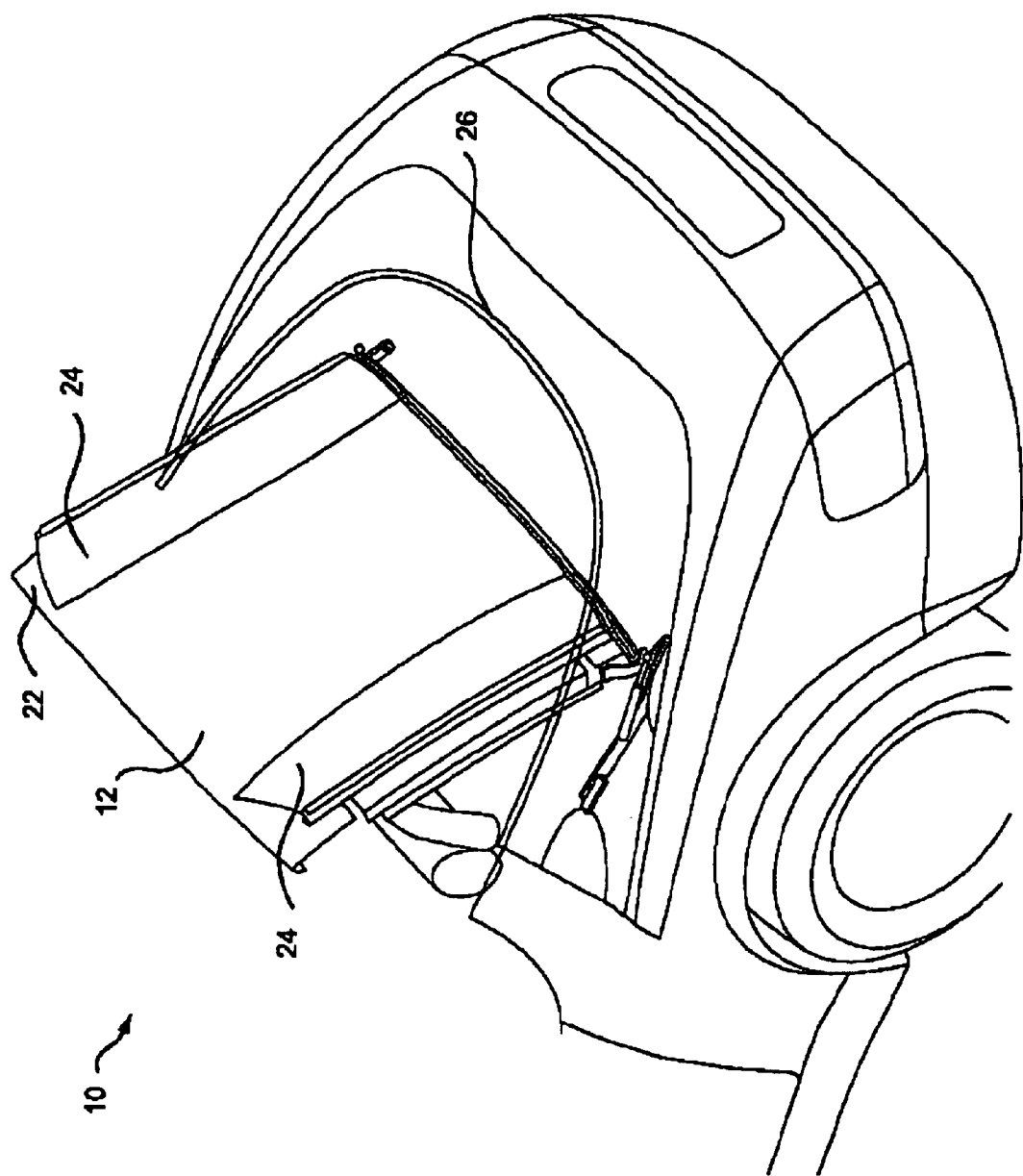
FIG. 10 shows the opening state according to FIG. 8 in perspective view.
Figure 11:
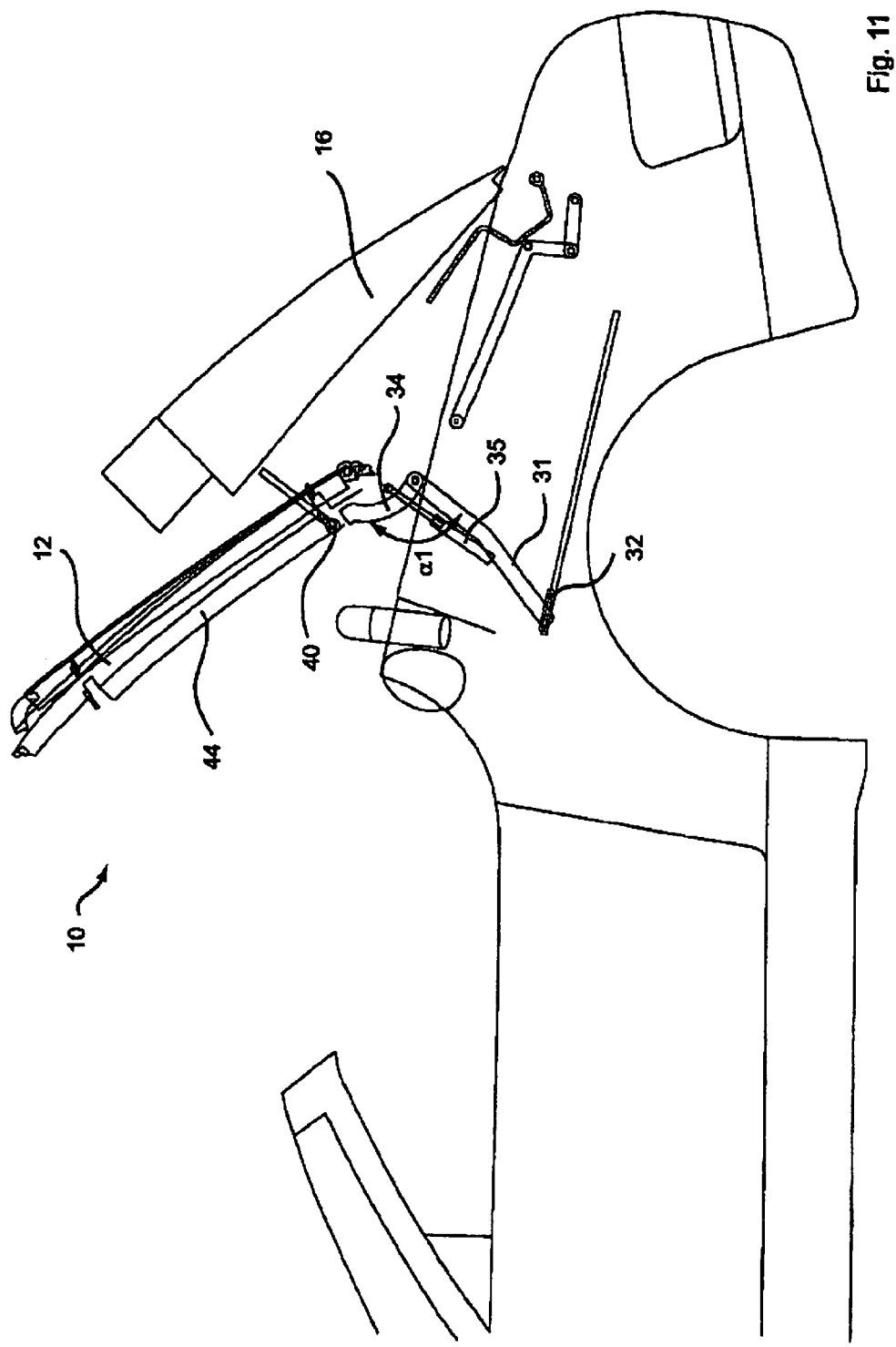
FIG. 11 shows the vehicle roof structure in the opening state according to FIG. 8 in side cross-sectional view.

By pivoting the connecting rod 31, the movable roof part 12 affixed thereon is moved therewith and is likewise rearwardly pivoted until a guide path 44 formed on the roof part 12 (it is again understood to preferably provide two guide paths 44 that are mounted on the movable roof part 12 symmetrical to a vehicle longitudinal middle plane) comes in contact with the roller pair 40 of the guide device (see FIGS. 9, 11). The guide path 44 can thus be formed in a covered manner, so that it is not visible when the movable vehicle roof 12 is closed. It can also, on the other hand, be designed as an ornamental strip that is visible in the closed position of the movable roof part 12. In this case, the rollers 40 of the guide device move on the guide path 44 of the ornamental strip.

Figure 12:
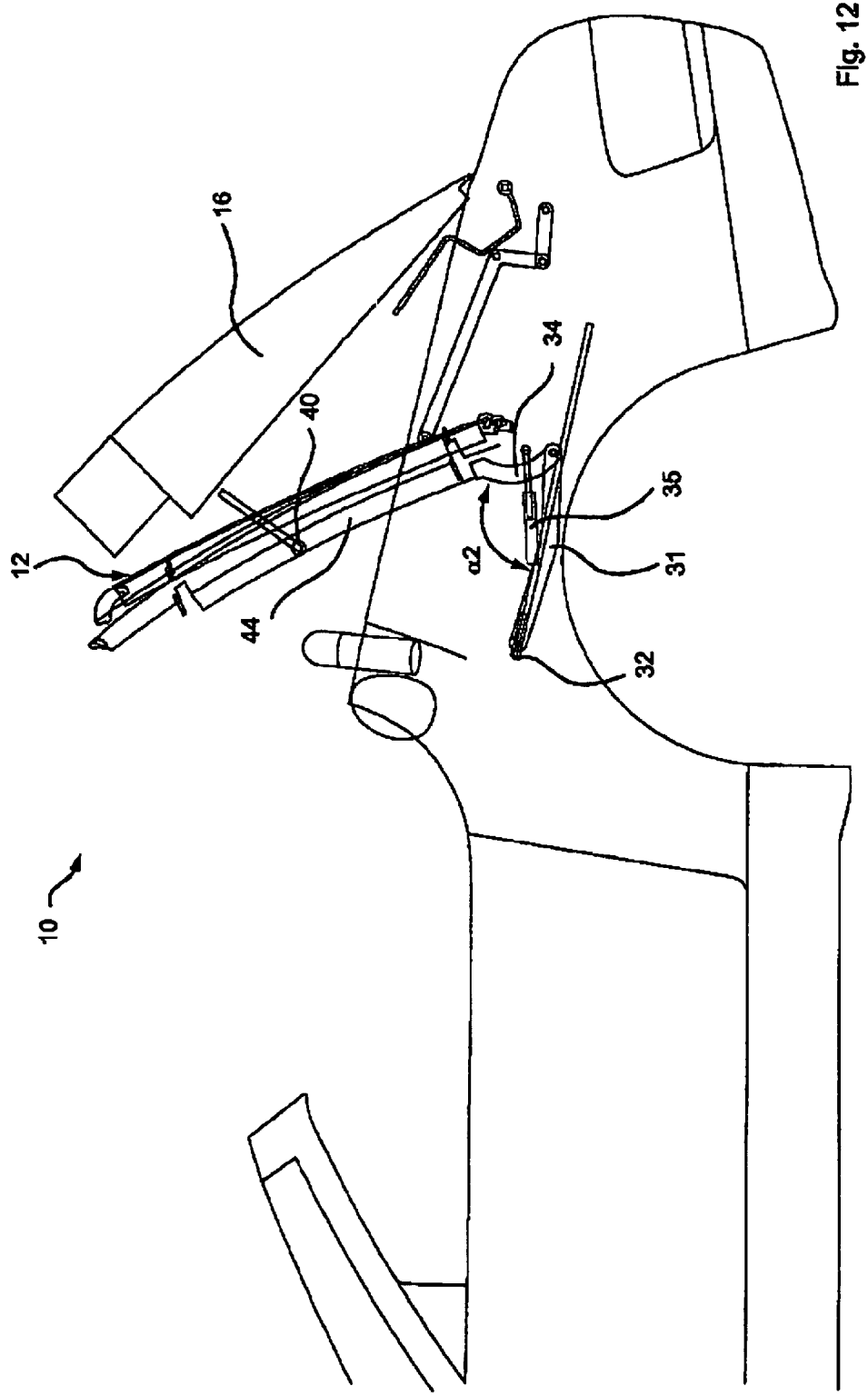
FIG. 12 shows the opening process in a farther advanced opening state in side cross-sectional view.
Figure 13:
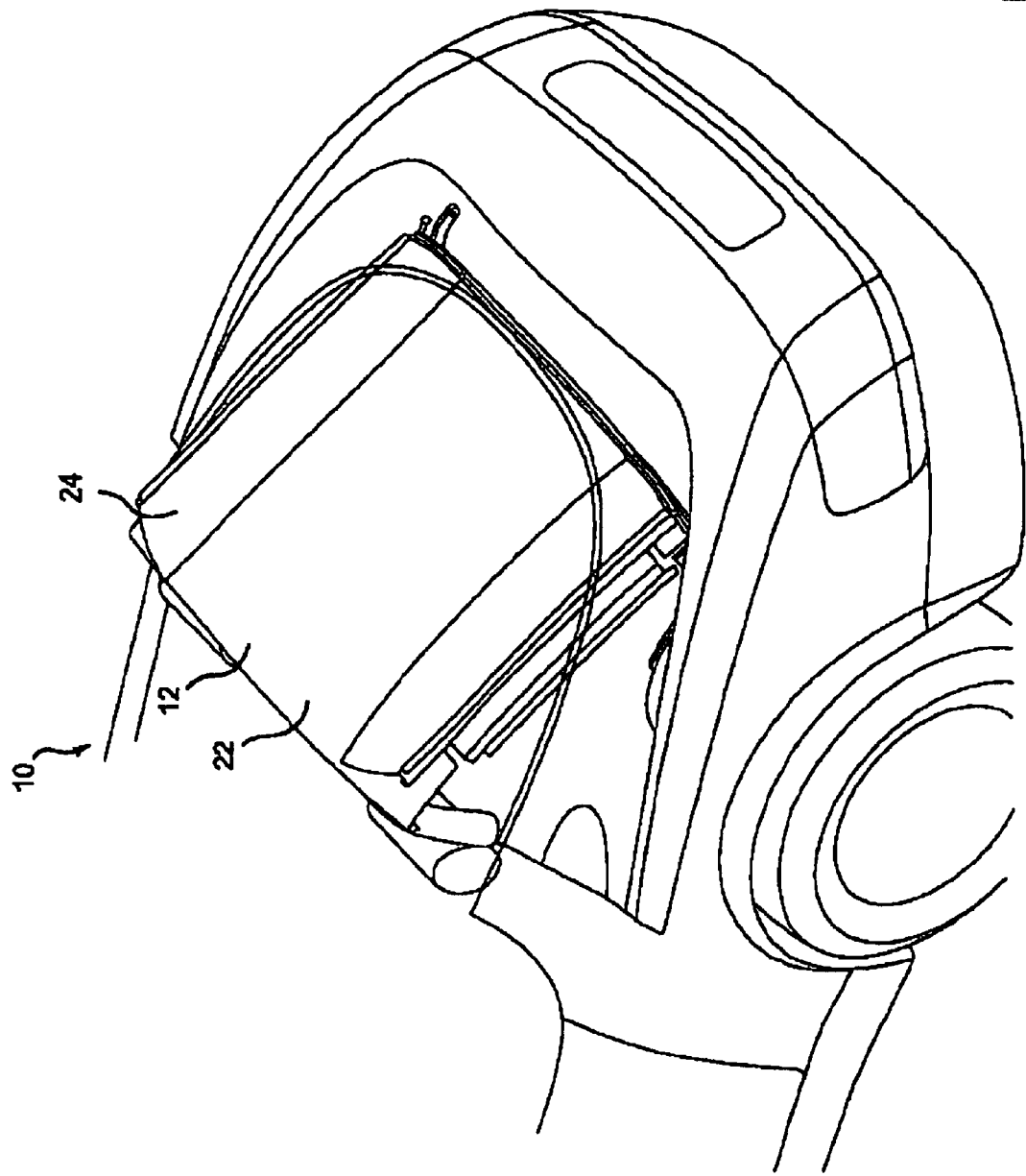
FIG. 13 represents the opening state according to FIG. 12 in perspective view.
Figure 14:
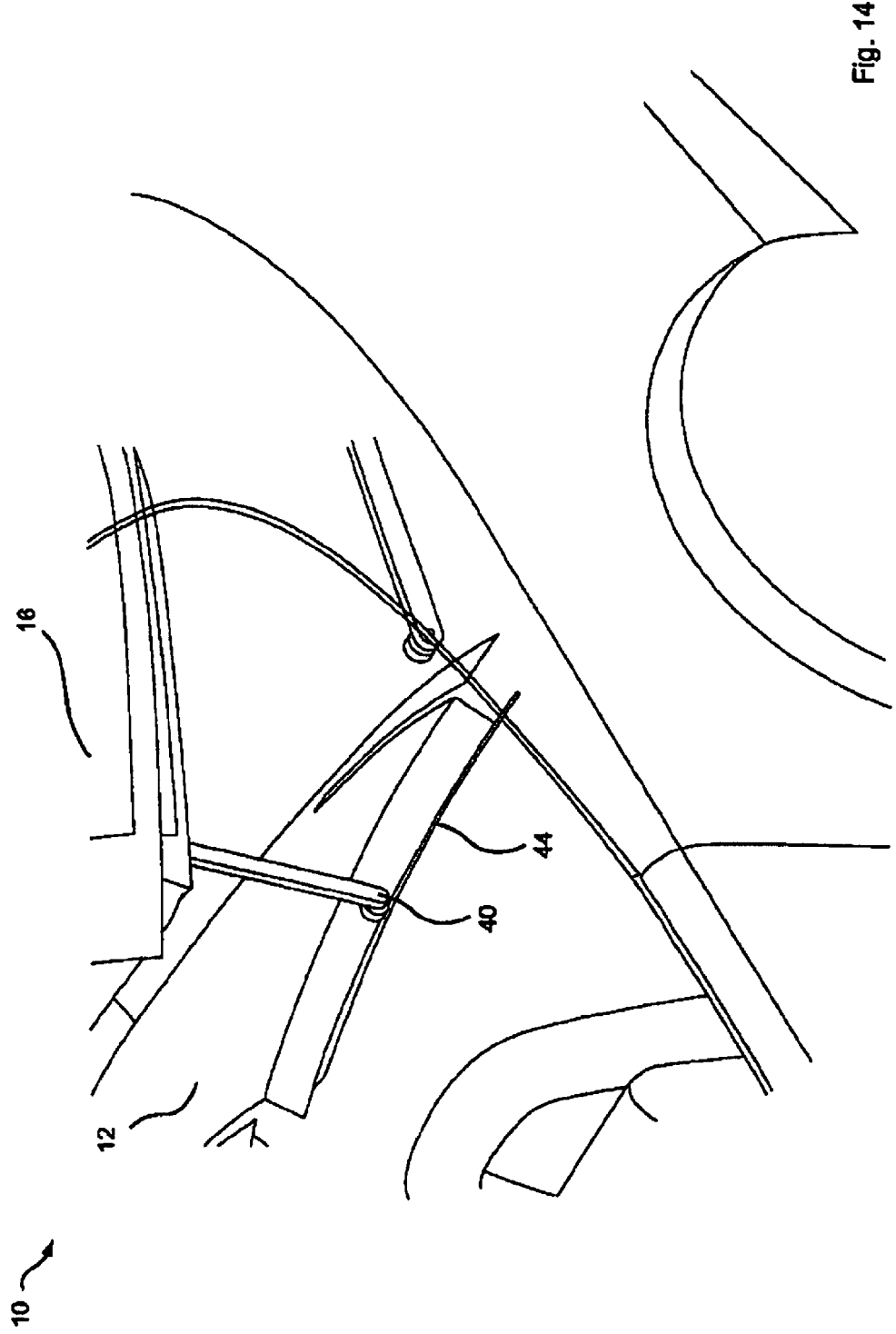
FIG. 14 illustrates another perspective view of the vehicle roof structure in the opening state according to FIG. 12.

Upon pivoting up to the position shown in FIGS. 8-11, the guide path 44 arrives in contact with the first roller pair 40. The connecting rod 31 is subsequently further pivoted by the drive about the rotational point of the connecting rod 31 on the carriage 32 until the connecting rod 31 arrives in a horizontal position, in which position the free end of the connecting rod 31, on which the connecting rod 34 is coupled, lies rearward. At the same time, the connecting rod 34 is pivoted in the counter-clockwise direction according to the illustration in the figures. The carriage 32 is continued to be held stationary. However, since the guide path 44 and the rollers 40 are in contact with each other, a force is applied to the connecting rod assembly 31, 34, which force works against the biasing direction of the pneumatic spring 35. Therefore, it is effected that connecting rods 31, 34 rotate with respect to each other, i.e. in particular the connecting rod 34 folds in about an axis perpendicular to the vehicle longitudinal direction onto the connecting rod 31 in the counter-clockwise direction in FIG. 12, so that the opening angle $\alpha 1$ between the connecting rod 31 and the connecting rod 34, which angle $\alpha 1$ is adjusted without influence of the guide device, is reduced to an angle $\alpha 2$ (FIG. 12). At this time, the guide path 44 and the roller 40 of the roller pair start to roll on each other, so that the roof part 12 experiences a directional change of its movement path with reference to the pivoting movement without influence of the roller pair 40 and simultaneously is further guided along a defined path into the vehicle body. The carriage 32 is still not moved at this time, but rather is held in its original position (forward-most position in the vehicle forward driving direction). Up to this time point, a drive of the connecting rod 31 is therefore merely required for moving the movable roof part 12. The submerged state of the movable roof part 12 in the vehicle body, which is illustrated in FIG. 12 in cross-section, is shown in FIGS. 13 and 14 in perspective view.

After the connecting rod 31 has arrived in the horizontal position, i.e. in its maximal pivoted position, in which due to the influence of the guide roller 40 against the biasing force of the pneumatic spring, the connecting rod 31 and the connecting rod 34 assume the angle $\alpha 2$ with respect to each other, a drive for the carriage 32 is subsequently activated, which drive can likewise be formed as an electronic drive, a hydraulic drive or another drive as necessary, and the carriage 32 is moved, so that it moves along the path 33 in the direction towards the vehicle rear end. Thus, the guide roller 40 remains in contact with the guide path 44 of the movable roof part 12. This means that the movable roof part, in particular the middle roof part 22 having the side roof parts 24 folded thereon, continues to undergo a pivoting movement about the rotational point between the connecting rod 31 and the connecting rod 34 due to the roller 40, so that the angle $\alpha$ is further reduced against the force of the pneumatic spring 35. As can be seen in FIG. 12, during this pivoting movement, the roller 42 of the roller pair initially does not contact the guide path 44.

Figure 15:
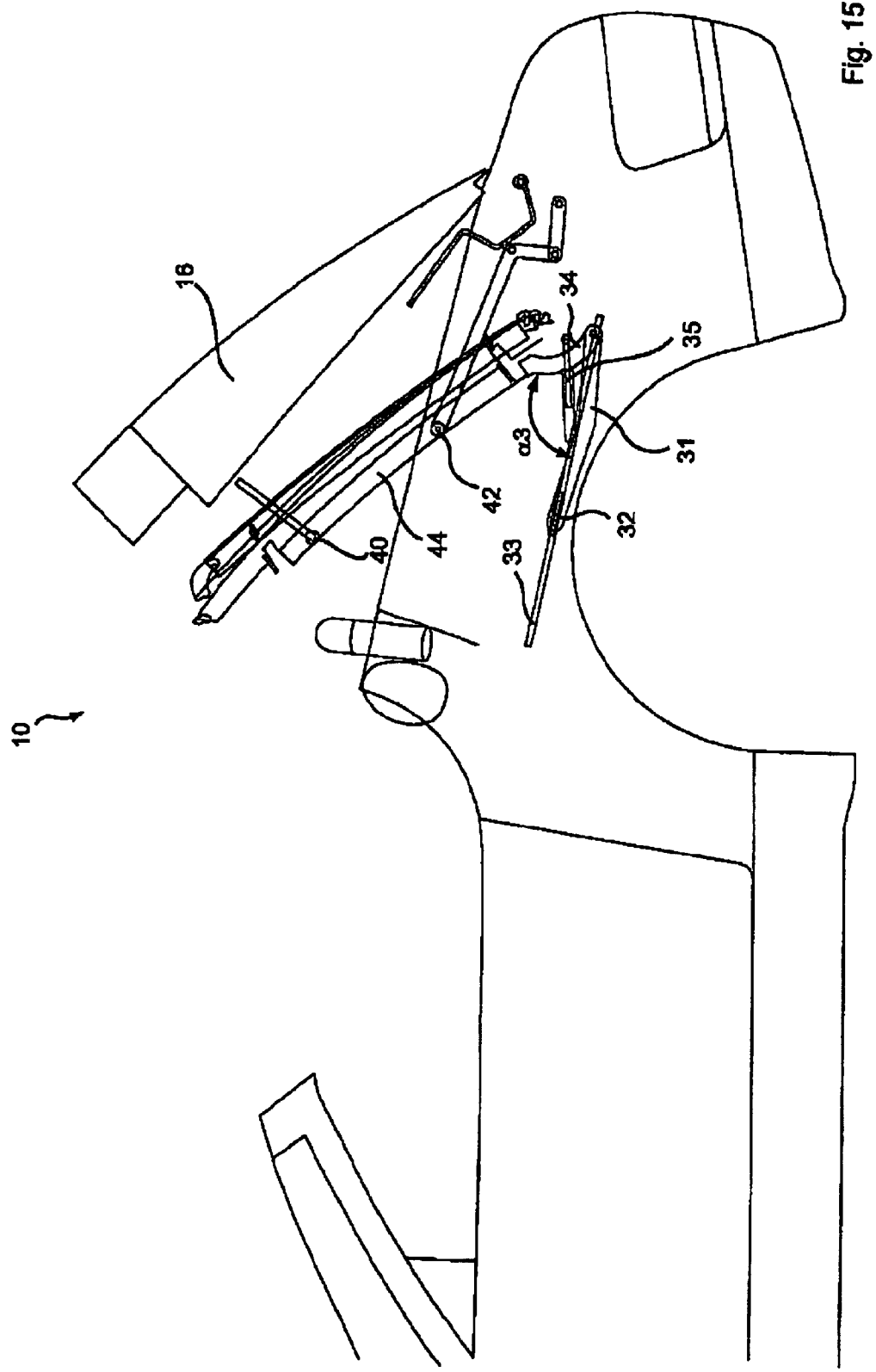
FIG. 15 illustrates a still farther advanced opening state in lateral cross-sectional view.
Figure 16:
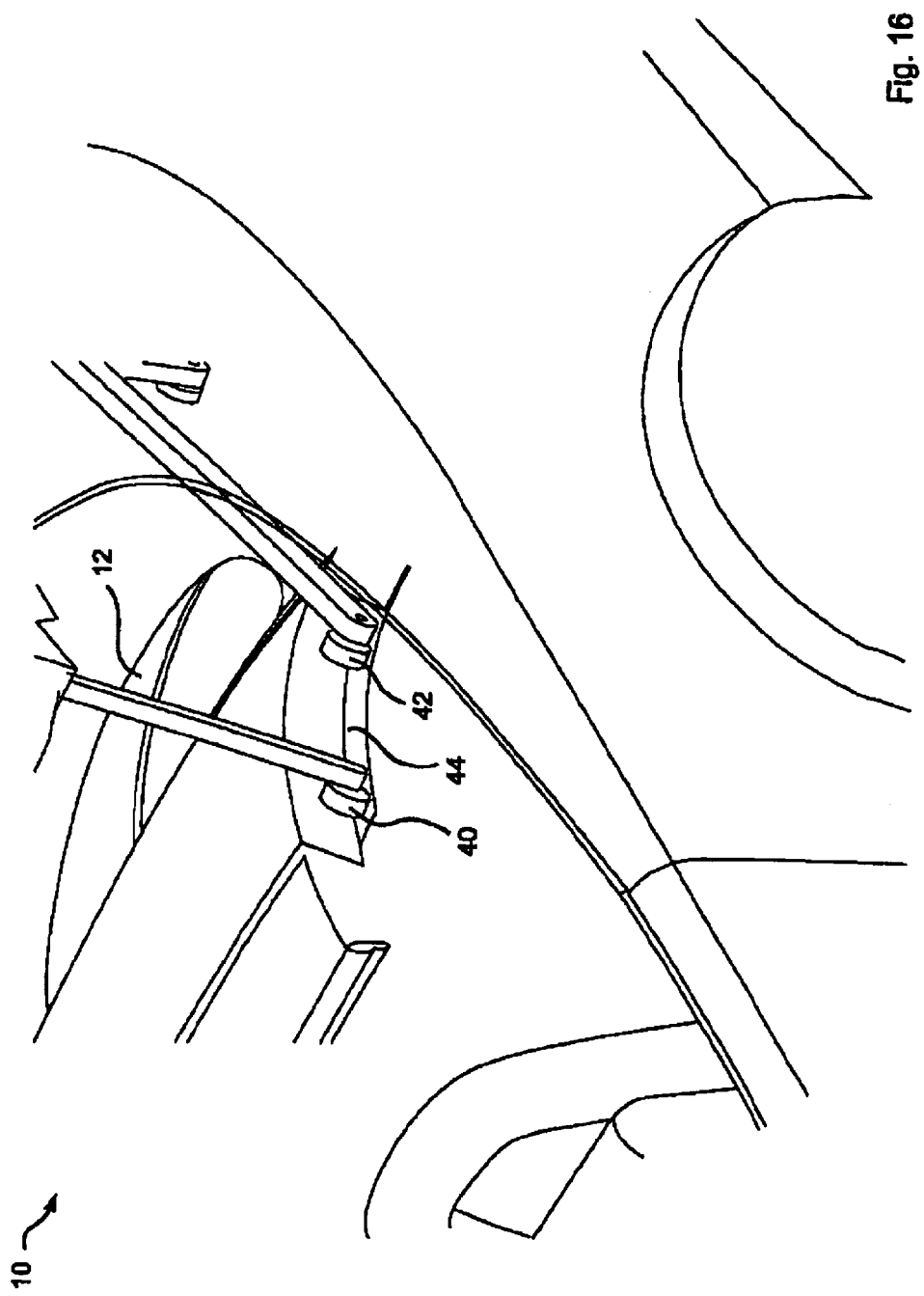
FIG. 16 shows the contact of the guide device constructed as guide rollers with the guide path of the motor vehicle in the opening state corresponding to FIG. 15 in perspective view.

After the above-described movement of the carriage 32 along the path 33, the roller pair 42 likewise arrives in contact with the guide path 44, as shown in FIG. 15. In this position, the roller pair 40 has nearly completely rolled along the guide path 44 of the movable roof part 12, i.e. in the direction from the rear end of the movable roof part 12 to the front end. In this position, in which the second roller pair 42 arrives in contact with the guide path 44, the connecting rods 31 and 34 assume the angle $\alpha 3$ with respect to each other. The connecting rod 31 is not pivoted farther about the linkage point on the carriage 32, but rather is only subjected to linear movement along the path 33 together with the carriage 32 and remains in the horizontal position.

Figure 17:
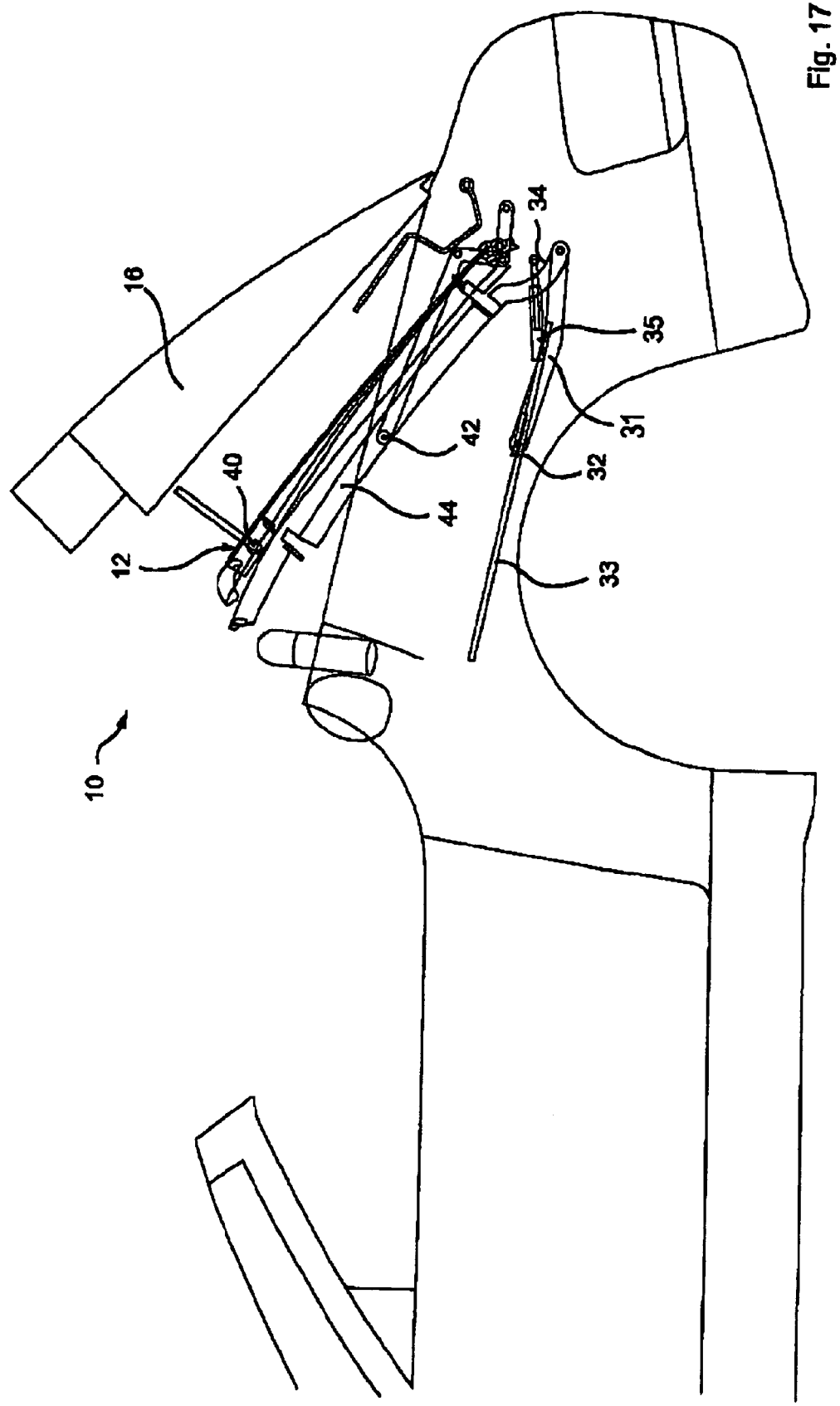
FIG. 17 shows a still farther advanced opening state of the vehicle roof in side cross-sectional view.
Figure 18:
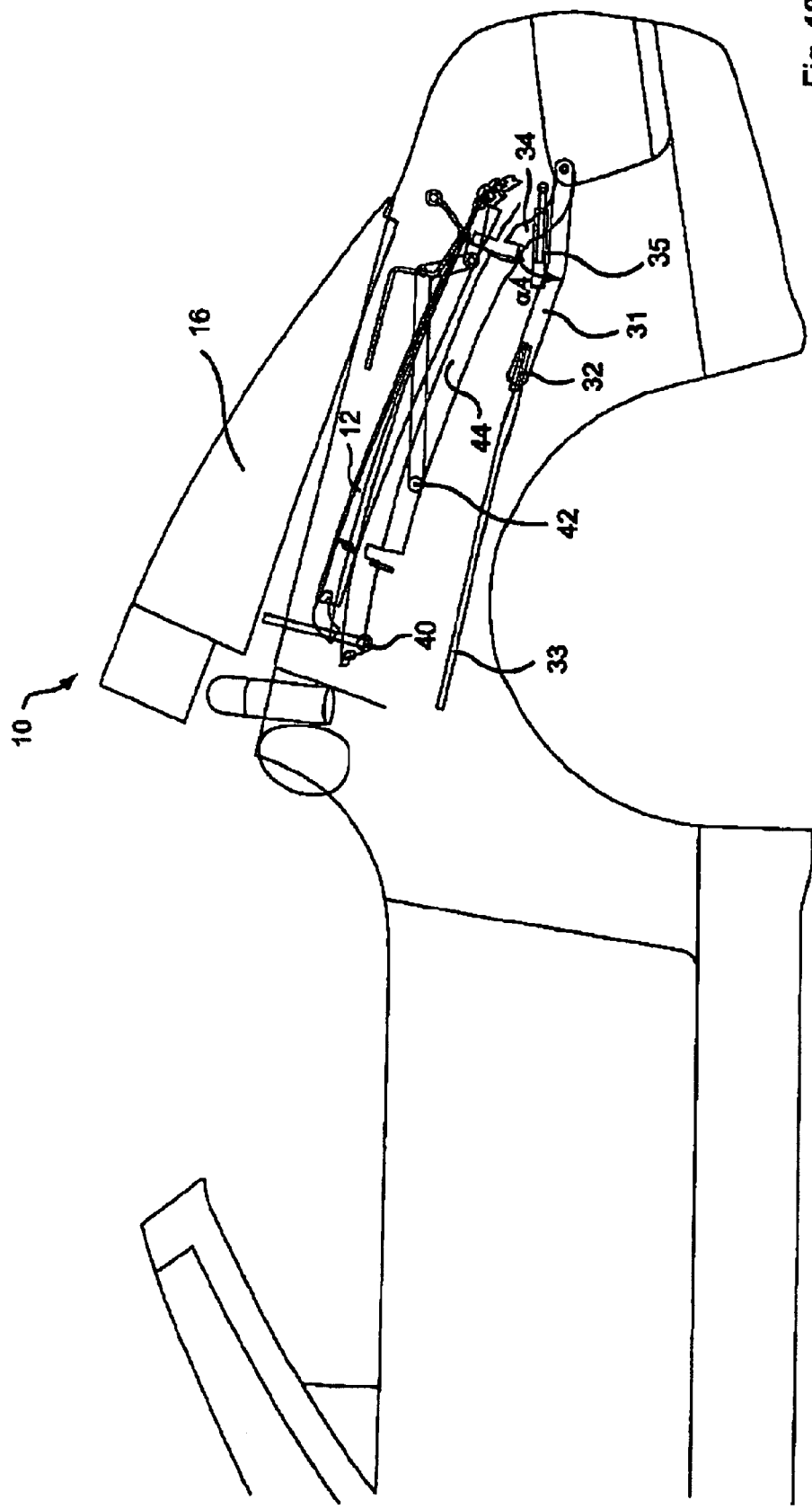
FIG. 18 shows an opening state of the vehicle roof in side cross-sectional view shortly before the end position.
Figure 19:
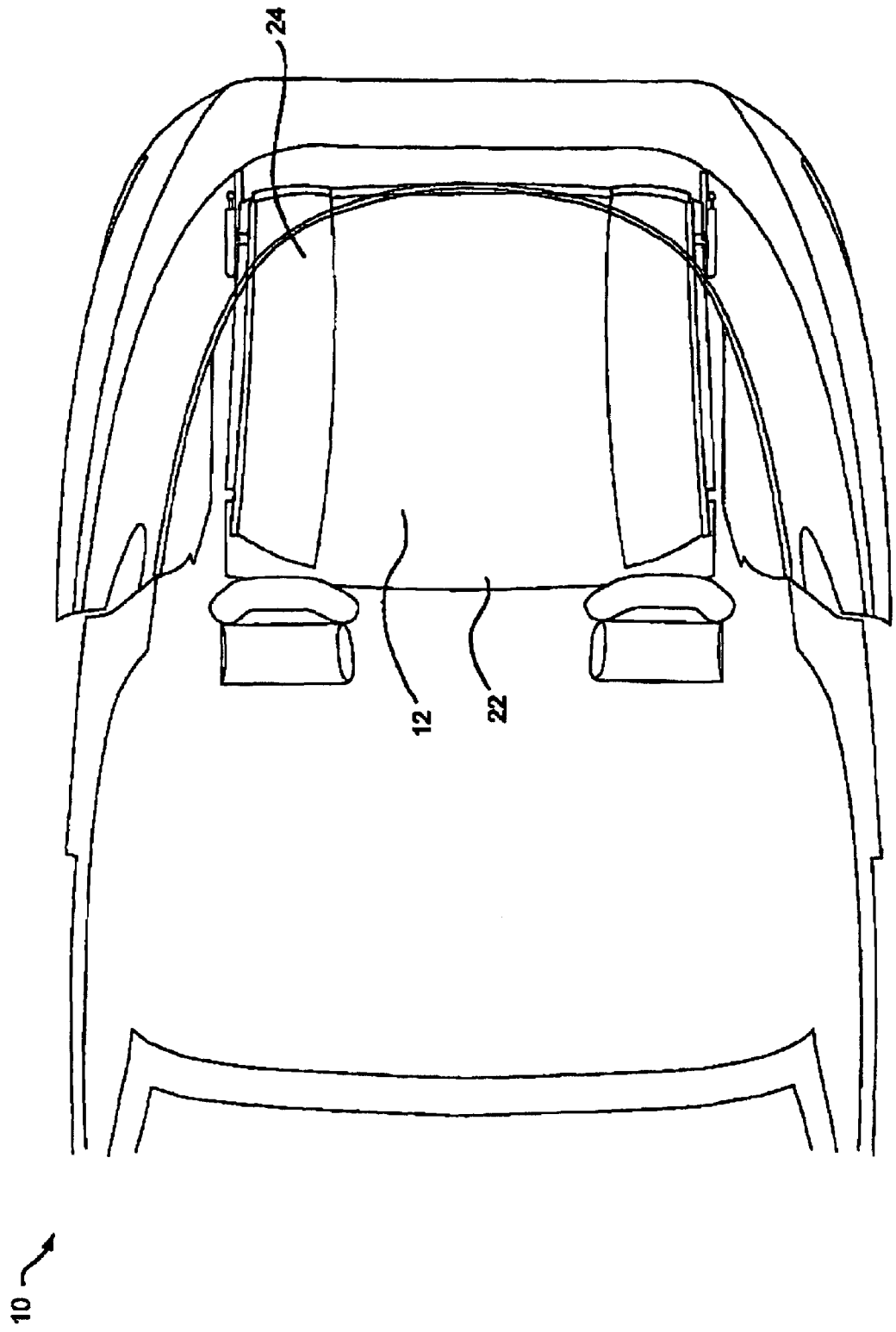
FIG. 19 shows the vehicle roof in the opened position in the top view.
Figure 20:
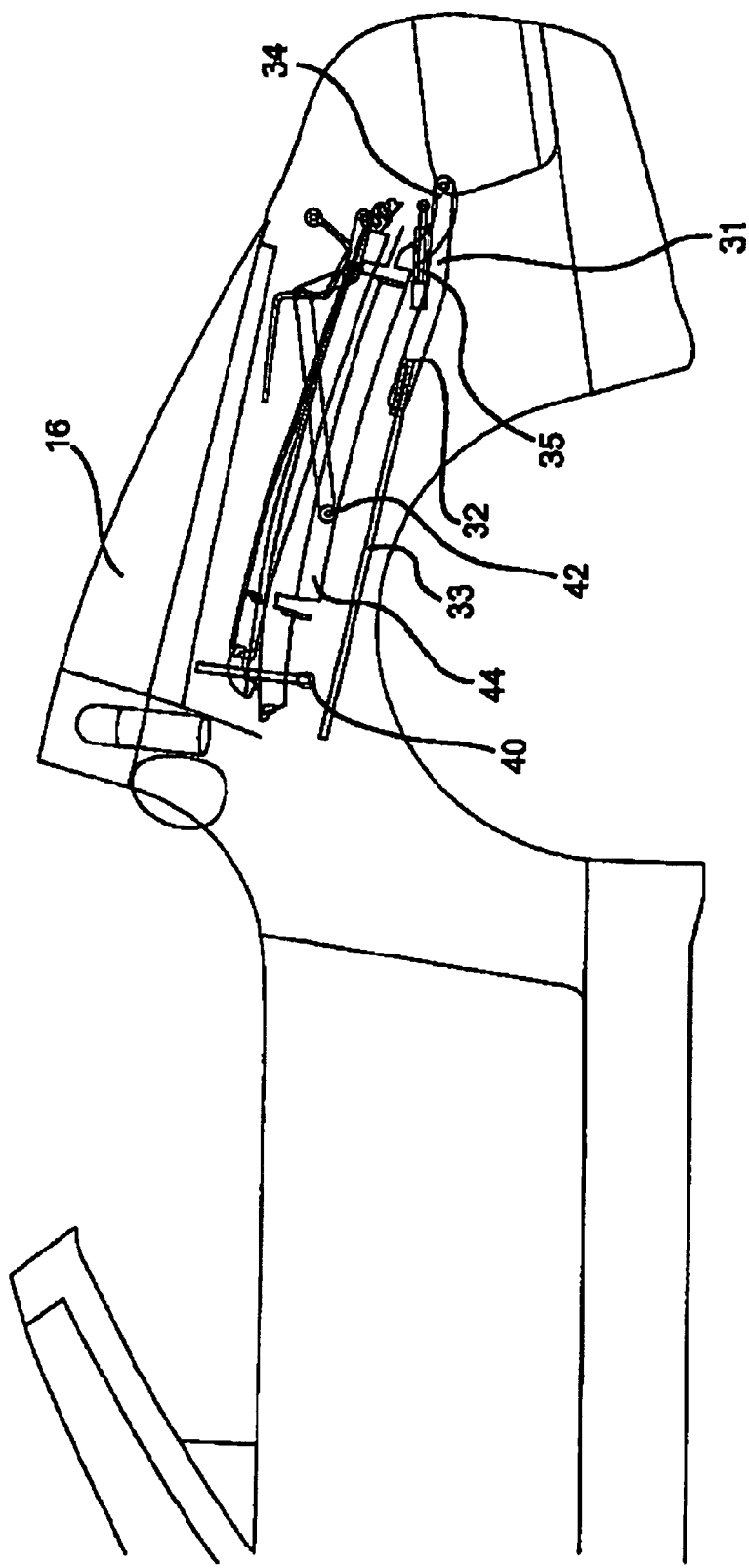
FIG. 20 shows the end position of the opened vehicle roof in side cross-sectional view.

After the roller 42 of the roller pair has arrived in contact with the guide path 44, a further directional change is imposed on the movement path of the movable roof part 12. In particular, as shown in FIGS. 17 and 18, the carriage 32 is further moved in a linear manner up to its rear end position (see FIG. 18), so that the movement path of the roof part causes a further closing movement of the connecting rods 31 and 34 with respect to each other against the influence of the pneumatic spring 35 until the connecting rods 31 and 34, and thus the roof part 12, have arrived in the position shown in FIG. 18. In doing so, the guidance work is undertaken by the roller 42. In the end position shown in FIG. 18, the connecting rods 31, 34 assume the angle $\alpha 4$ with respect to each other. The rollers 40 disengage from the guide path 44, so that the guidance in this segment of the movement path is effected solely by the rollers 42.

For the final loading of the movable roof part 12 into the vehicle body, after the carriage 32 has reached the end of the path 33, the final closed position is reached by further contact of the guide roller pair 42 on the guide path 44. The contact causes the rear roof part 16 to pivot inward via of the linkage mechanism 36, on which the roller 42 is affixed, i.e. the rear roof part 16 is brought into its closed position. Since the roller 42 is directly connected with the convertible top compartment lid 16, it is moved by the drive for closing the convertible top compartment lid 16, which drive can be formed as necessary as an electronic drive, hydraulic drive or the like. Therefore, the movable roof part 12 is directly drive together with the convertible top compartment lid 16 and is pivoted into its end position. Since the rollers 40 are no longer in contact with the guide path 44, they do not interfere with the closing movement. Thus, the pressure contact of the roller 42 on the guide path 44 effects a further directional change of the movement path of the roof part 12. The end position is shown in perspective view in FIG. 19 and in cross-sectional view in FIG. 20.

By the exemplified system, which in total utilizes three separate controllable and temporally-offset operated drives (one for the rotational movement of the connecting rod 31, one for the carriage 32 and one for the pivoting movement of the convertible top compartment linkage mechanism 36), a precisely-defined movement path can be achieved, so that the movable roof part 12 can be loaded into a relatively severely-constricted opening 26 of the vehicle body even when space proportions are constricted.

Instead of the described linkage assembly and pneumatic spring, other types of biasing devices and/or movement devices also could be utilized, as long as is a guide device provided separate from the driven linkage assembly is attached for moving the movable roof part, which guide device is stationary with respect to at least either the convertible top compartment lid or the vehicle body and initiates a directional change of the movement path by contact with the movement path of the movable roof part. When closing the roof part, the movements are performed in the reverse direction.

REFERENCE NUMBER LIST 10 vehicle roof structure
12 movable roofpart
14 windshield frame
16 rear roof part (convertible top compartment lid)
18 A-pillar
20 B-pillar
22 middle roof part 24 side roof part
26 opening line
30 linkage mechanism
31 connecting rod
32 carriage
33 path
34 connecting rod
35 pneumatic spring
36 linkage mechanism
40 roller pair
42 roller pair
44 guide path
$\alpha 1$ angle between connecting rod 31 and connecting rod 34 without influence of the guide device
$\alpha 2$ angle between connecting rod 31 and connecting rod 34 with influence of the roller pair 40
$\alpha 3$ angle between connecting rod 31 and connecting rod 34 with influence of the roller pair 40
$\alpha 4$ angle between connecting rod 31 and connecting rod 34 with influence of the roller pair 42

The invention claimed is:

1. A roof structure for a vehicle having a windshield frame, at least one rear-side convertible top compartment lid and a vehicle body, the roof structure comprising:
   a rigid roof part arranged and constructed to be movable between an opened position and a closed position, wherein in the closed position, the roof part is arranged and constructed to extend between the windshield frame and the convertible top compartment lid and in the opened position, the roof part is arranged and constructed to be stored in a space underneath the convertible top compartment lid,
   a linkage mechanism arranged and constructed to move the roof part between the closed position and the opened position, and
   at least one guide device arranged and constructed to contact the roof part during one segment of the movement path between the opened position and the closed position, wherein the guide device includes at least one guide element arranged and constructed to be supported on the convertible top compartment lid or the vehicle body, the at least one guide element being arranged and constructed to contact and then move along a guide path defined on the roof part when the roof part is moving from its closed position to its opened position and thereby effect a directional change of the movement path of the roof part when the guide device arrives in contact with the roof part.

2. A roof structure according to claim 1, wherein the guide device comprises at least one roller.

3. A roof structure according to claim 2, wherein the guide device comprises a first roller and a second roller that respectively serve as first and second guide elements and are arranged and constructed to be supported on the convertible top compartment lid and the vehicle body, respectively, displaced from each other in a longitudinal direction of the vehicle, the first roller being arranged and constructed to effect a first directional change on the movement path of the roof part when the roof part moves from the closed position into the opened position and the second roller being arranged and constructed to effect a second directional change on the movement path of the roof part when the roof part moves from the closed position into the opened position.

4. A roof structure according to claim 3, wherein the movement path of the roof part between the closed position and the opened position comprises:
   a first segment, in which the first and second rollers are not in contact with the roof part,
   a second segment, in which the first roller is in contact with the guide path of the roof part, and
   a third segment, in which the second roller is in contact with the guide path of the roof part and the first roller is not in contact with the guide path of the roof part.

5. A roof structure according to claim 4, wherein the guide path is defined by an ornamental strip mounted on the surface of the roof part.

6. A roof structure according to claim 5, wherein the linkage mechanism comprises:
   a connecting rod assembly, which is rotatably mountable on the vehicle body, having two connecting rods that are rotatable with respect to each other, wherein a first rotational axis of the connecting rods with respect to each other extends essentially in parallel to a second rotational axis of the connecting rod assembly relative to the vehicle body, and
   a biasing device biasing the connecting rods towards a predetermined first angular position with respect to each other, the connecting rod assembly being arranged and constructed to be movable against the biasing force of the biasing device into a second angular position when the at least one guide device contacts the roof part.

7. A roof structure according to claim 6, wherein the connecting rod assembly is arranged and constructed to be supported in a linearly displaceable manner with respect to the vehicle body.

8. A roof structure according to claim 7, further comprising a second linkage mechanism arranged and constructed to be connected with the convertible top compartment lid and the vehicle body, wherein the second linkage mechanism is connected with the second roller.

9. A roof structure according to claim 8, wherein the roof part is divided into a plurality of contiguous areas such that, by displacement of portions of the roof part with respect to each other, the width of the roof part is variable between a reduced width and a normal width, and wherein the roof part is arranged and constructed to be movable between its opened position and its closed position while in the reduced width configuration.

10. A roof structure according to claim 1, wherein the guide path is defined by an ornamental strip mounted on the surface of the roof part.

11. A roof structure according to claim 1, wherein the linkage mechanism comprises:
    a connecting rod assembly, which is rotatably mountable on the vehicle body, having two connecting rods that are rotatable with respect to each other, wherein a first rotational axis of the connecting rods with respect to each other extends essentially in parallel to a second rotational axis of the connecting rod assembly relative to the vehicle body, and
    a biasing device biasing the connecting rods towards a predetermined first angular position with respect to each other, the connecting rod assembly being arranged and constructed to be movable against the biasing force of the biasing device into a second angular position when the at least one guide device contacts the roof part.

12. A roof structure according to claim 11, wherein the connecting rod assembly is arranged and constructed to be supported in a linearly displaceable manner with respect to the vehicle body.

13. A roof structure according to claim 11, further comprising a second linkage mechanism arranged and constructed to be connected with the convertible top compartment lid and the vehicle body, wherein the second linkage mechanism is connected with a second guide element of the guide device such that the second guide element effects a second directional change of the movement path of the roof part during a closing movement of the convertible top compartment lid.

14. A roof structure according to claim 1, wherein the roof part is divided into a plurality of contiguous areas such that, by displacement of portions of the roof part with respect to each other, the width of the roof part is variable between a reduced width and a normal width, and wherein the roof part is arranged and constructed to be movable between its opened position and its closed position while in the reduced width configuration.

15. A vehicle comprising:
a vehicle body,
a windshield frame connected to the vehicle body,
at least one rear-side convertible top compartment lid pivotably coupled to the vehicle body,
a rigid roof part arranged and constructed to be movable between an opened position and a closed position, wherein in the closed position, the roof part extends between the windshield frame and the convertible top compartment lid and in the opened position, the roof part is storable in a space defined in the vehicle body underneath the convertible top compartment lid,
a linkage mechanism arranged and constructed to move the roof part between the closed position and the opened position, and
at least one guide device arranged and constructed to contact the roof part during one segment of the movement path between the opened position and the closed position, wherein the guide device includes at least one guide element supported on the convertible top compartment lid or the vehicle body, the at least one guide element being arranged and constructed to contact and then move along a guide path defined on the roof part when the roof part is moving from its closed position to its opened position and thereby effect a directional change of the movement path of the roof part when the guide device arrives in contact with the roof part.

16. A vehicle according to claim 15, wherein the guide device comprises at least one roller.

17. A vehicle according to claim 15, wherein the guide device comprises a first roller supported on the convertible top compartment lid and a second roller supported on the vehicle body, the first roller being displaced from the second roller in a longitudinal direction of the vehicle, the first roller being arranged and constructed to effect a first directional change on the movement path of the roof part when the roof part moves from the closed position into the opened position and the second roller being arranged and constructed to effect a second directional change on the movement path of the roof part when the roof part moves from the closed position into the opened position.

18. A vehicle according to claim 17, wherein the movement path of the roof part between the closed position and the opened position comprises:
a first segment, in which the first and second rollers are not in contact with the roof part,
a second segment, in which the first roller is in contact with the guide path of the roof part, and
a third segment, in which the second roller is in contact with the guide path of the roof part and the first roller is not in contact with the guide path of the roof part.

19. A vehicle according to claim 15, wherein the guide path is defined by an ornamental strip mounted on the surface of the roof part.

20. A vehicle according to claim 15, wherein the linkage mechanism comprises:
a connecting rod assembly rotatably-borne on the vehicle body and having two connecting rods that are rotatable with respect to each other, wherein a first rotational axis of the connecting rods with respect to each other extends essentially in parallel to a second rotational axis of the connecting rod assembly relative to the vehicle body, and
a biasing device biasing the connecting rods towards a predetermined first angular position with respect to each other, the connecting rod assembly being arranged and constructed to be movable against the biasing force of the biasing device into a second angular position when the at least one guide device contacts the roof part.

21. A vehicle according to claim 20, wherein the connecting rod assembly is supported with respect to the vehicle body in a linearly displaceable manner.

22. A vehicle according to claim 21, further comprising a second linkage mechanism coupled to the convertible top compartment lid and the vehicle body, wherein the second linkage mechanism is connected with a second guide element such that the guide device effects a second directional change of the movement path of the roof part during a closing movement of the convertible top compartment lid.

23. A vehicle according to claim 15, wherein the roof part is divided into a plurality of contiguous areas such that, by displacement of portions of the roof part with respect to each other, the width of the roof part is variable between a reduced width and a normal width, and wherein the roof part is arranged and constructed to be movable between its opened position and its closed position while in the reduced width configuration.

* * * * *

UNITED STATES PATENT AND TRADEMARK OFFICE
CERTIFICATE OF CORRECTION

PATENT NO.        : 7,455,347 B2                                           Page 1 of 1
APPLICATION NO.   : 10/580282
DATED             : November 25, 2008
INVENTOR(S)       : Udo Heselhaus et al.

It is certified that error appears in the above-identified patent and that said Letters Patent is hereby corrected as shown below:

On the title page:   Item [22] Replace "(22) PCT Filed: Sept. 16, 2004" with
-- (22) PCT Filed: Sept. 17, 2004 --

Signed and Sealed this

Twenty-sixth Day of May, 2009

JOHN DOLL
*Acting Director of the United States Patent and Trademark Office*